(12) United States Patent
Kim et al.

(10) Patent No.: US 10,071,717 B2
(45) Date of Patent: Sep. 11, 2018

(54) ELECTRIC BRAKE SYSTEM

(71) Applicant: MANDO CORPORATION, Gyeonggi-do (KR)

(72) Inventors: Gi-Yung Kim, Gyeonggi-do (KR); Seong-Ho Choi, Gyeonggi-do (KR); Dong-Yo Ryu, Gyeonggi-do (KR); Yong-Kap Kim, Gyeonggi-do (KR); Weon-Chan Ko, Gyeonggi-do (KR); Hyun-Ho Kim, Gyeonggi-do (KR); Eun-Seong Lim, Gyeonggi-do (KR); In-Wook Jeon, Seoul (KR); Yeong-Sik Kim, Gyeonggi-do (KR); Byong-Hoo Cheong, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 20 days.

(21) Appl. No.: 15/355,059

(22) Filed: Nov. 18, 2016

(65) Prior Publication Data
US 2017/0144642 A1 May 25, 2017

(30) Foreign Application Priority Data

Nov. 19, 2015 (KR) .......................... 10-2015-0162404

(51) Int. Cl.
*B60T 13/68* (2006.01)
*B60T 13/74* (2006.01)
(Continued)

(52) U.S. Cl.
CPC ............ *B60T 13/745* (2013.01); *B60T 7/042* (2013.01); *B60T 13/146* (2013.01);
(Continued)

(58) Field of Classification Search
CPC .... B60T 13/142; B60T 13/161; B60T 13/662; B60T 13/686; B60T 13/745; B60T 8/34; B60T 8/1755
(Continued)

(56) References Cited

U.S. PATENT DOCUMENTS

| | | | | |
|---|---|---|---|---|
| 4,346,944 A | * | 8/1982 | Leiber | .................. B60T 8/3635 303/115.4 |
| 5,188,435 A | * | 2/1993 | Willmann | ................. B60T 8/26 303/113.2 |

(Continued)

FOREIGN PATENT DOCUMENTS

EP 2 520 473 11/2012

*Primary Examiner* — Christopher P Schwartz
(74) *Attorney, Agent, or Firm* — Ladas & Parry, LLP

(57) ABSTRACT

An electric brake system is disclosed. The electric brake system includes a hydraulic pressure supply device configured to generate hydraulic pressure using a piston which is operated by means of an electrical signal and including a first and a second pressure chamber, a first hydraulic flow path, a second hydraulic flow path, a third hydraulic flow path, a sixth hydraulic flow path, a seventh hydraulic flow path, a first control valve provided at the first hydraulic flow path, a second control valve provided at the second hydraulic flow path, a third control valve provided at the third hydraulic flow path, a seventh control valve provided at the sixth hydraulic flow path, an eighth control valve provided at the seventh hydraulic flow path, a first hydraulic circuit including first and second branching flow paths, and first and second inlet valves, and a second hydraulic circuit including third and fourth branching flow paths which branch from the second hydraulic flow path and are connected to two wheel cylinders, respectively.

20 Claims, 14 Drawing Sheets

(51) Int. Cl.
*B60T 7/04* (2006.01)
*B60T 13/14* (2006.01)
*B60T 13/66* (2006.01)

(52) U.S. Cl.
CPC .......... *B60T 13/662* (2013.01); *B60T 13/686* (2013.01); *B60T 2270/82* (2013.01)

(58) Field of Classification Search
USPC ................................ 303/114.1, 113.1–113.5
See application file for complete search history.

(56) References Cited

U.S. PATENT DOCUMENTS

| | | |
|---|---|---|
| 2013/0213025 A1 | 8/2013 | Linden |
| 2014/0028083 A1 | 1/2014 | Gerdes et al. |
| 2016/0159331 A1* | 6/2016 | Yang ..................... B60T 13/142 303/15 |
| 2016/0159332 A1* | 6/2016 | Yang ..................... B60T 13/142 303/15 |
| 2017/0106846 A1* | 4/2017 | Kim ........................ B60T 8/348 |
| 2017/0144643 A1* | 5/2017 | Kim ........................ B60T 7/042 |
| 2017/0144644 A1* | 5/2017 | Kim ........................ B60T 13/146 |
| 2017/0158180 A1* | 6/2017 | Kim ........................ B60T 7/042 |
| 2017/0210369 A1* | 7/2017 | Lim ........................ B60T 7/042 |

\* cited by examiner

[Fig. 1]
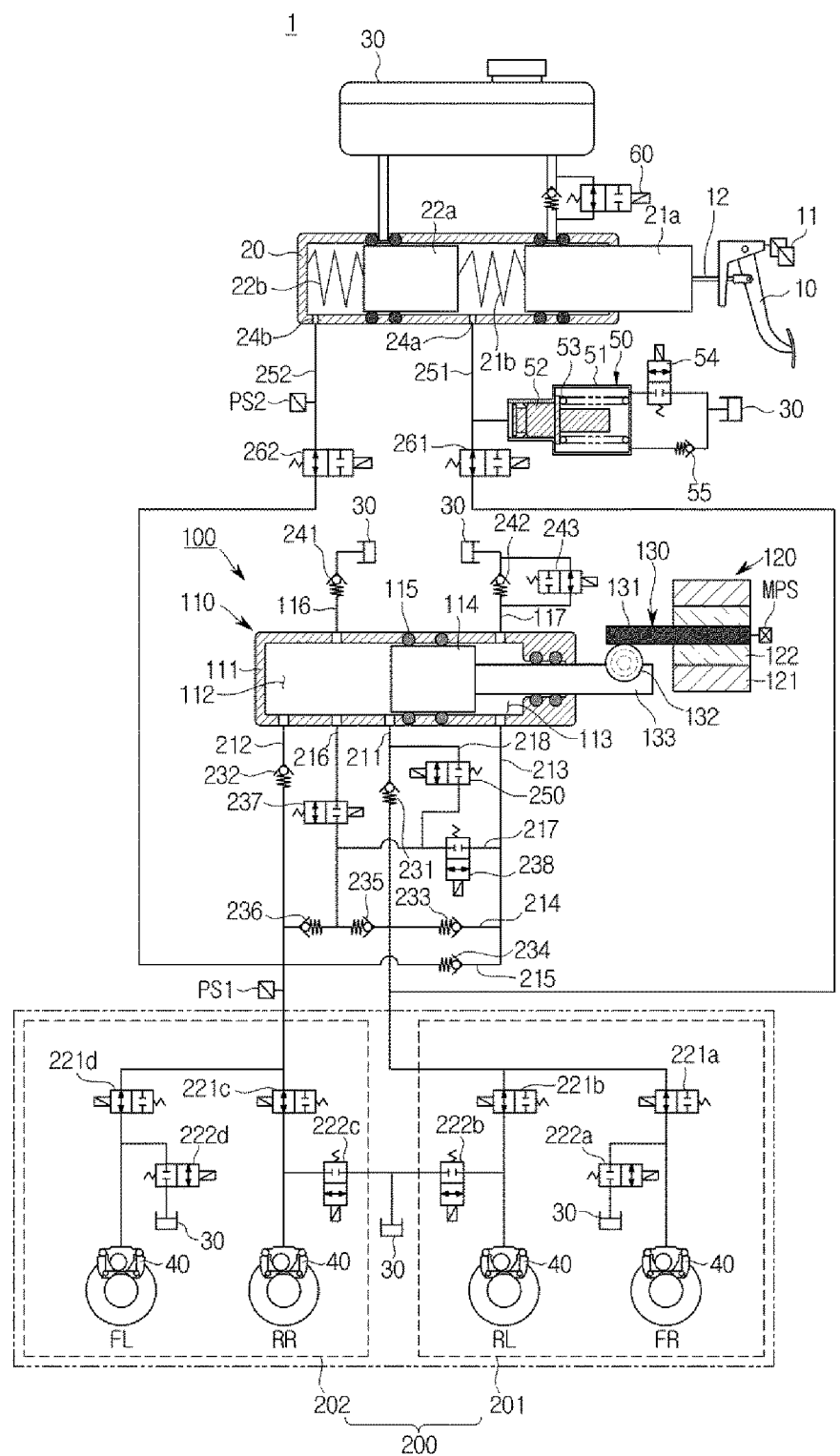

[Fig. 2]
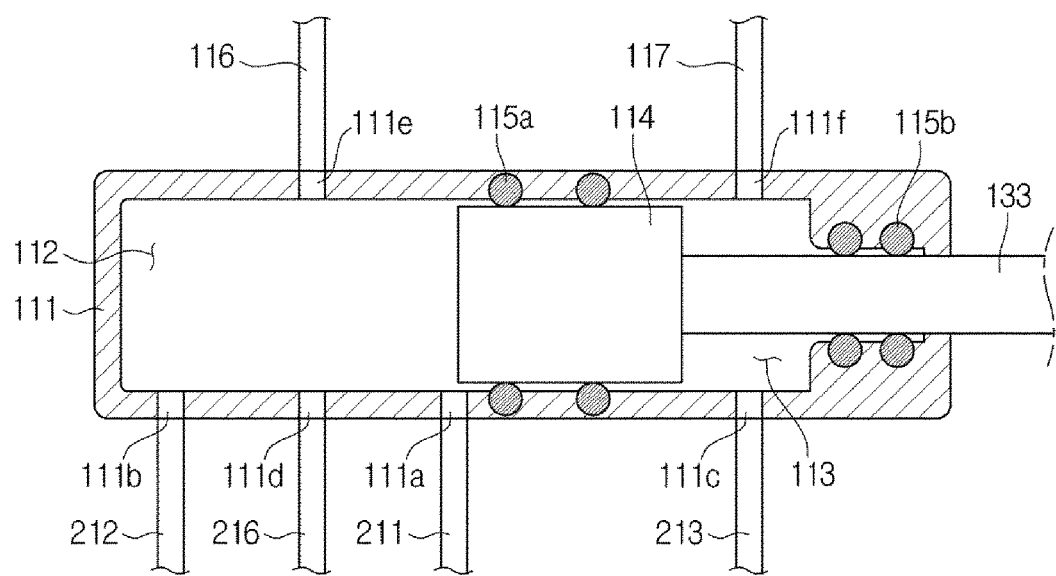

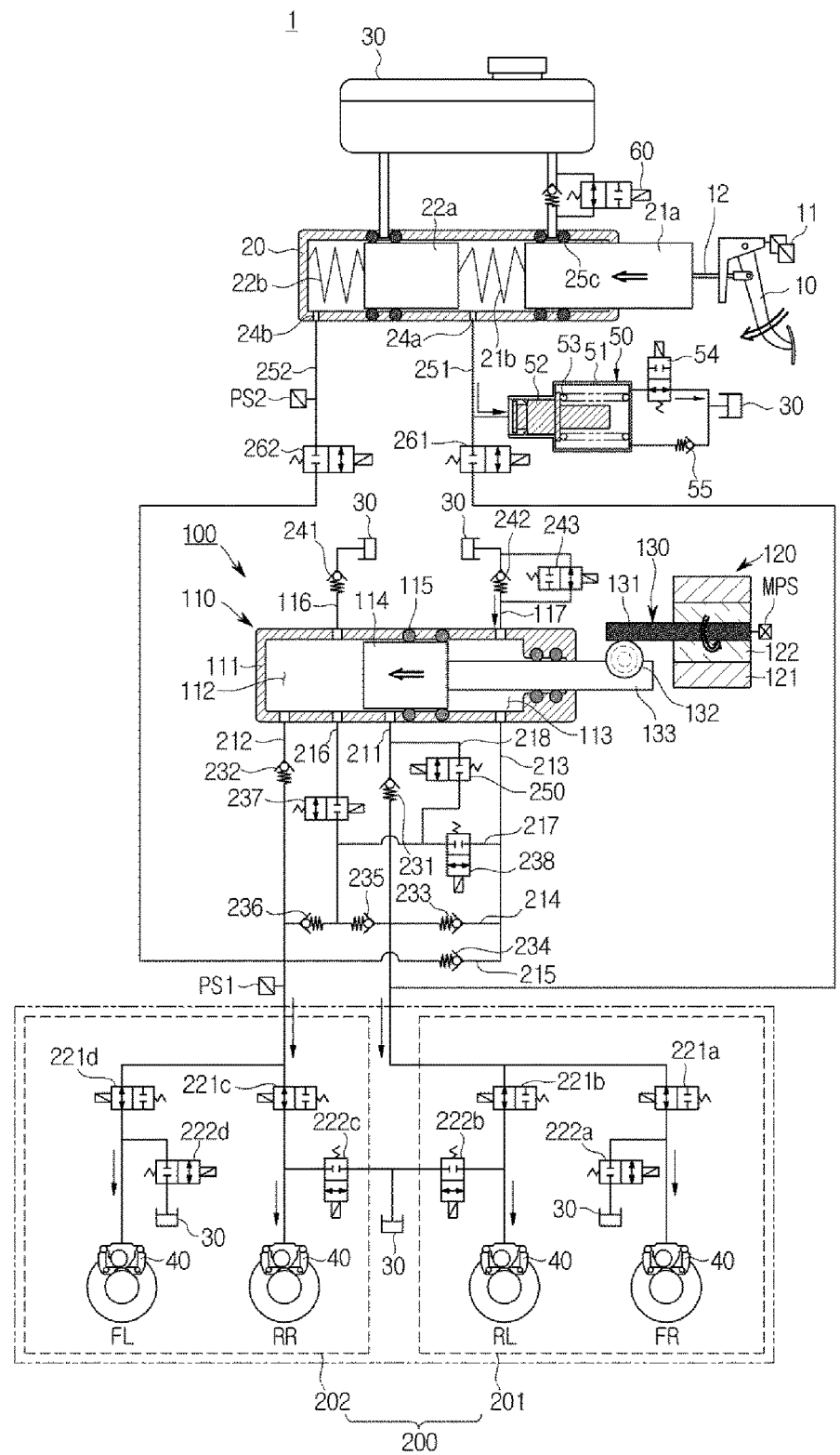
[Fig. 3]

[Fig. 4]
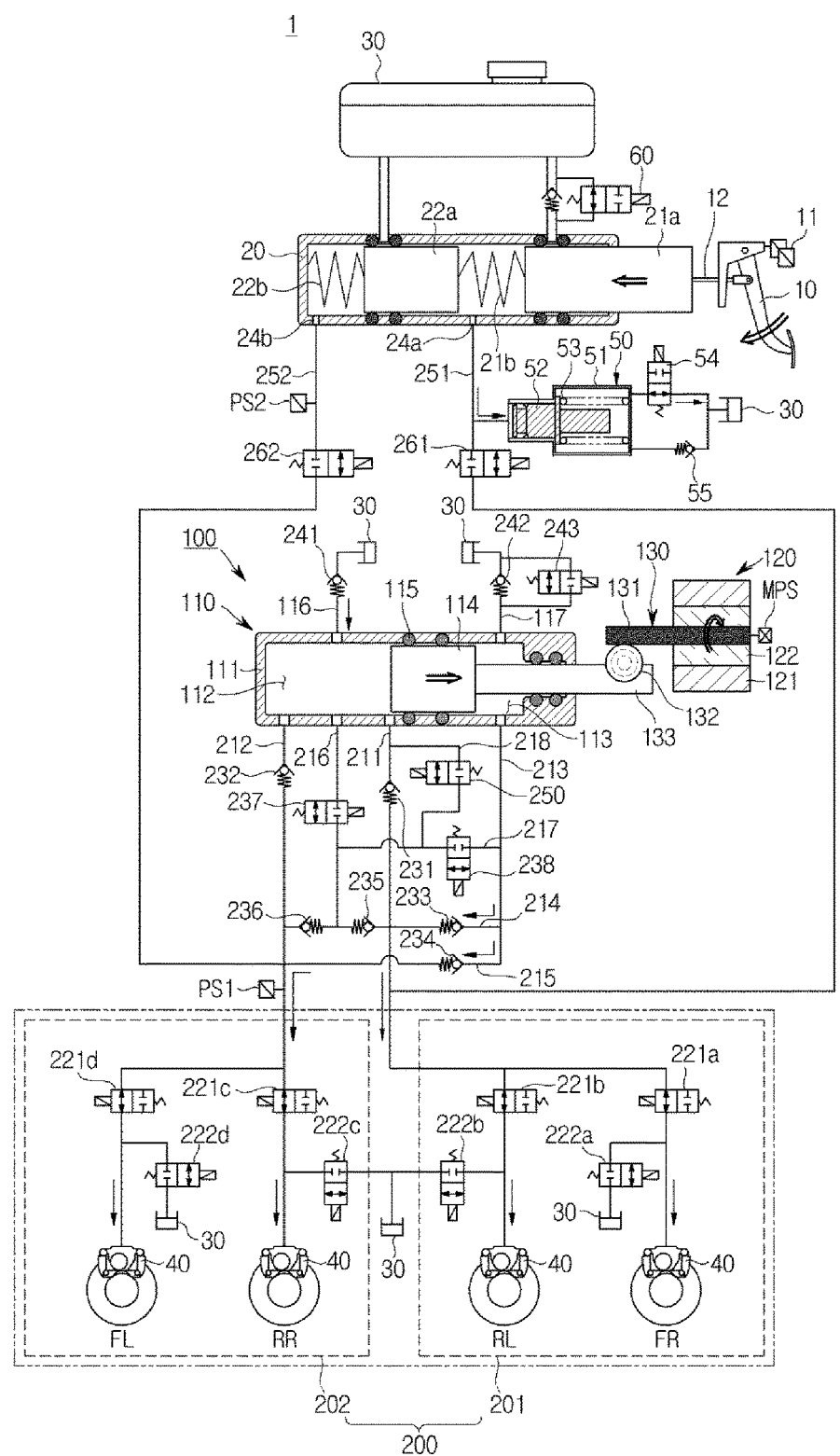

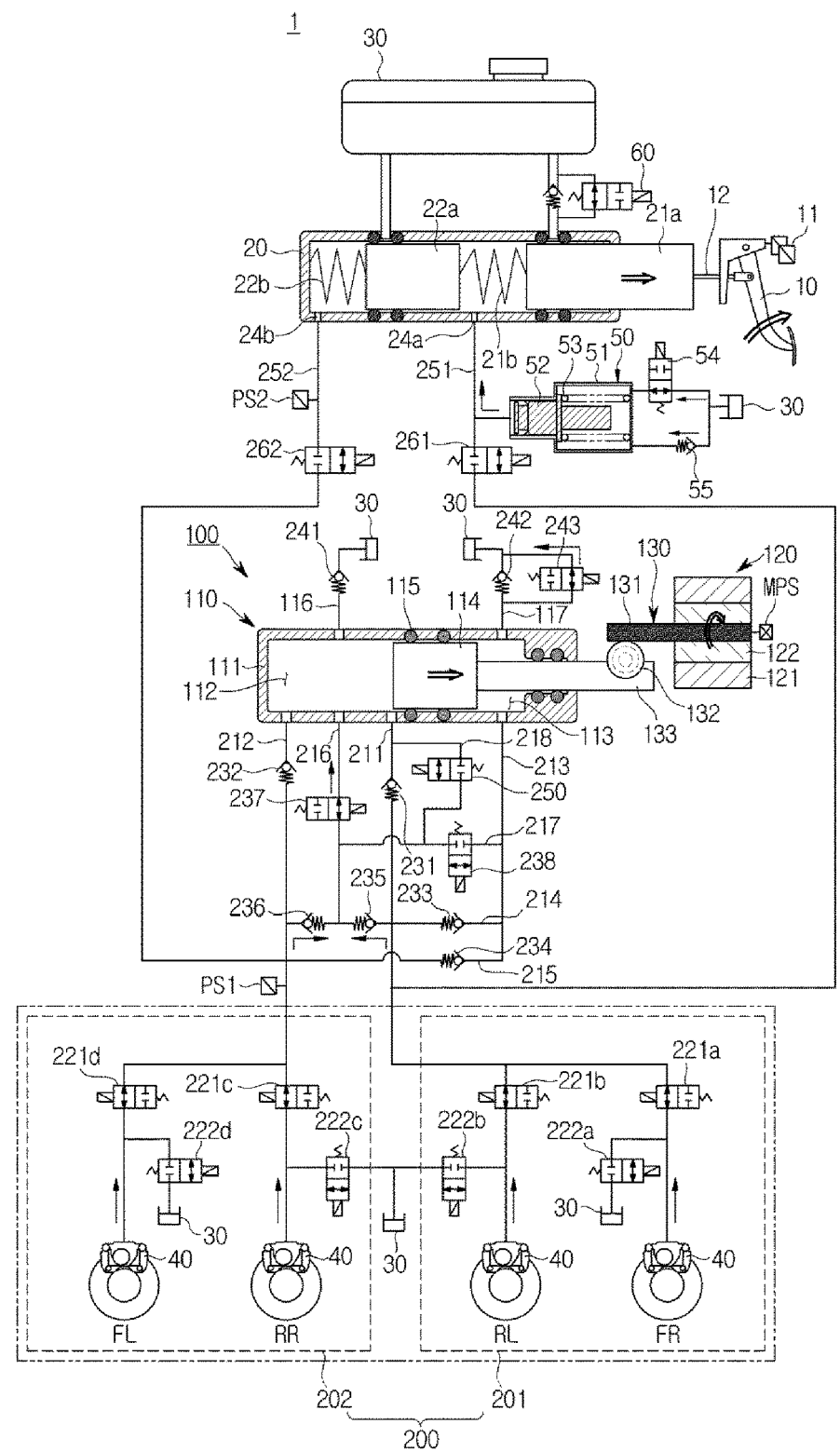
[Fig. 5]

[Fig. 6]
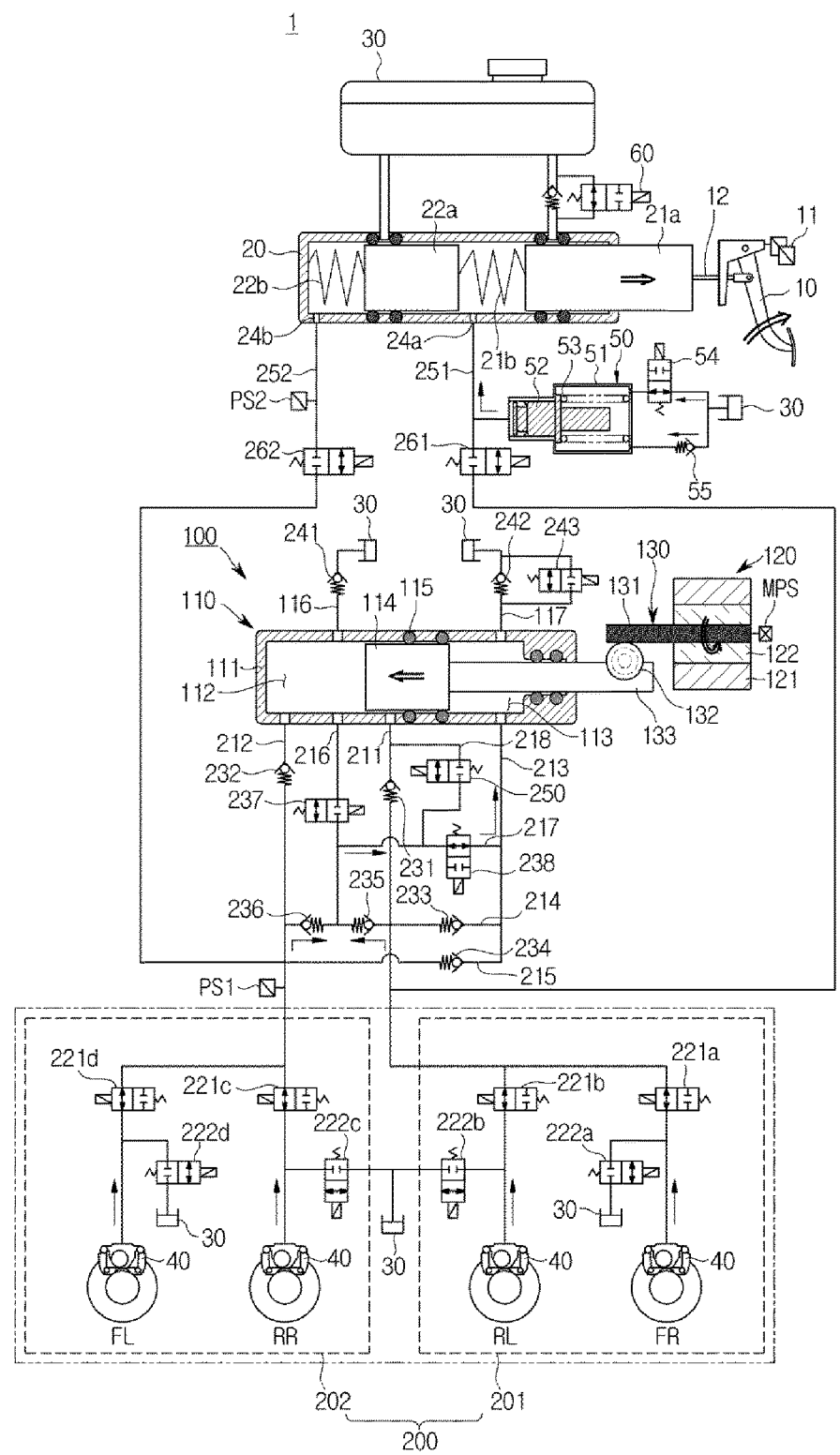

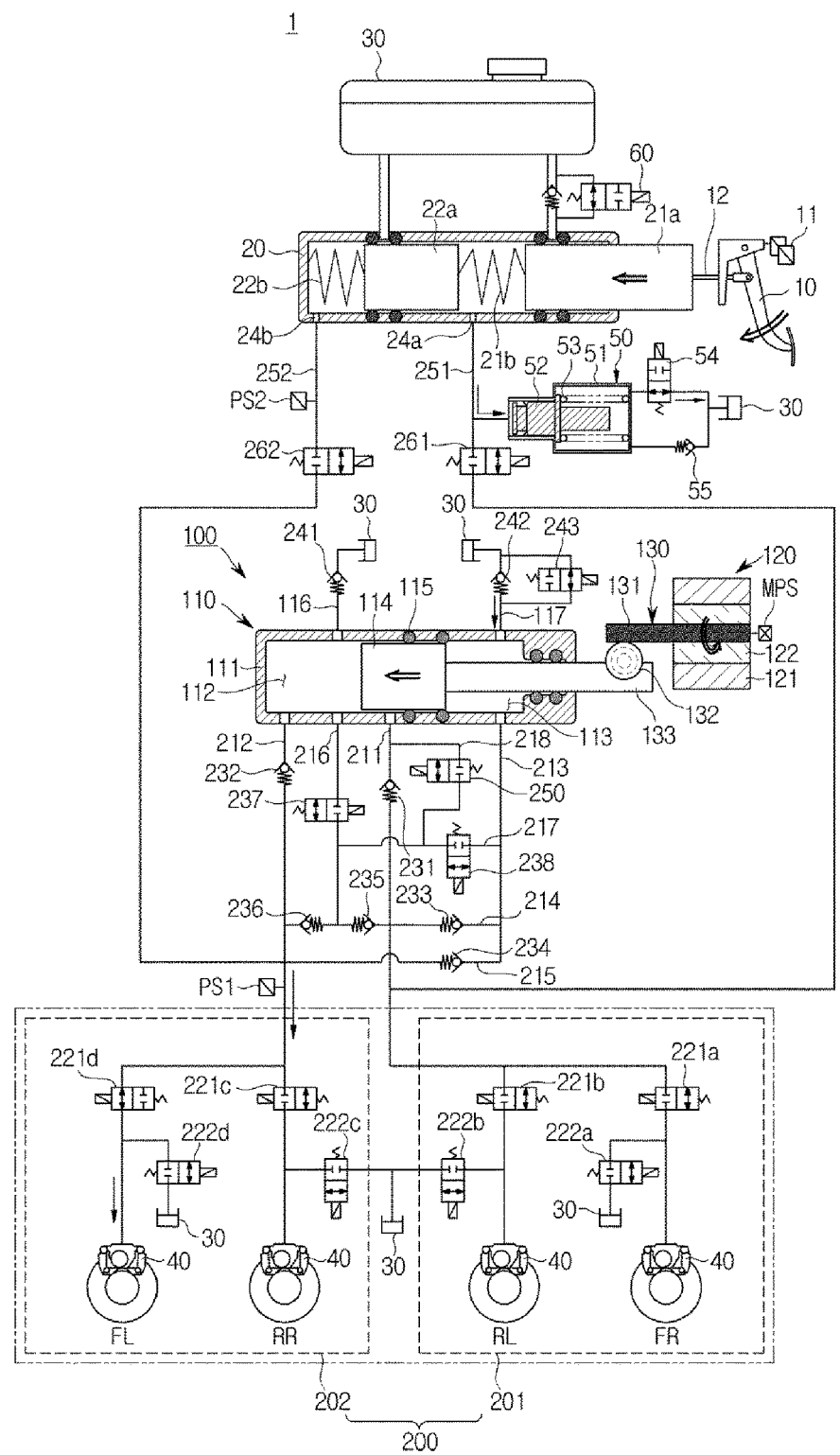
[Fig. 7]

[Fig. 8]
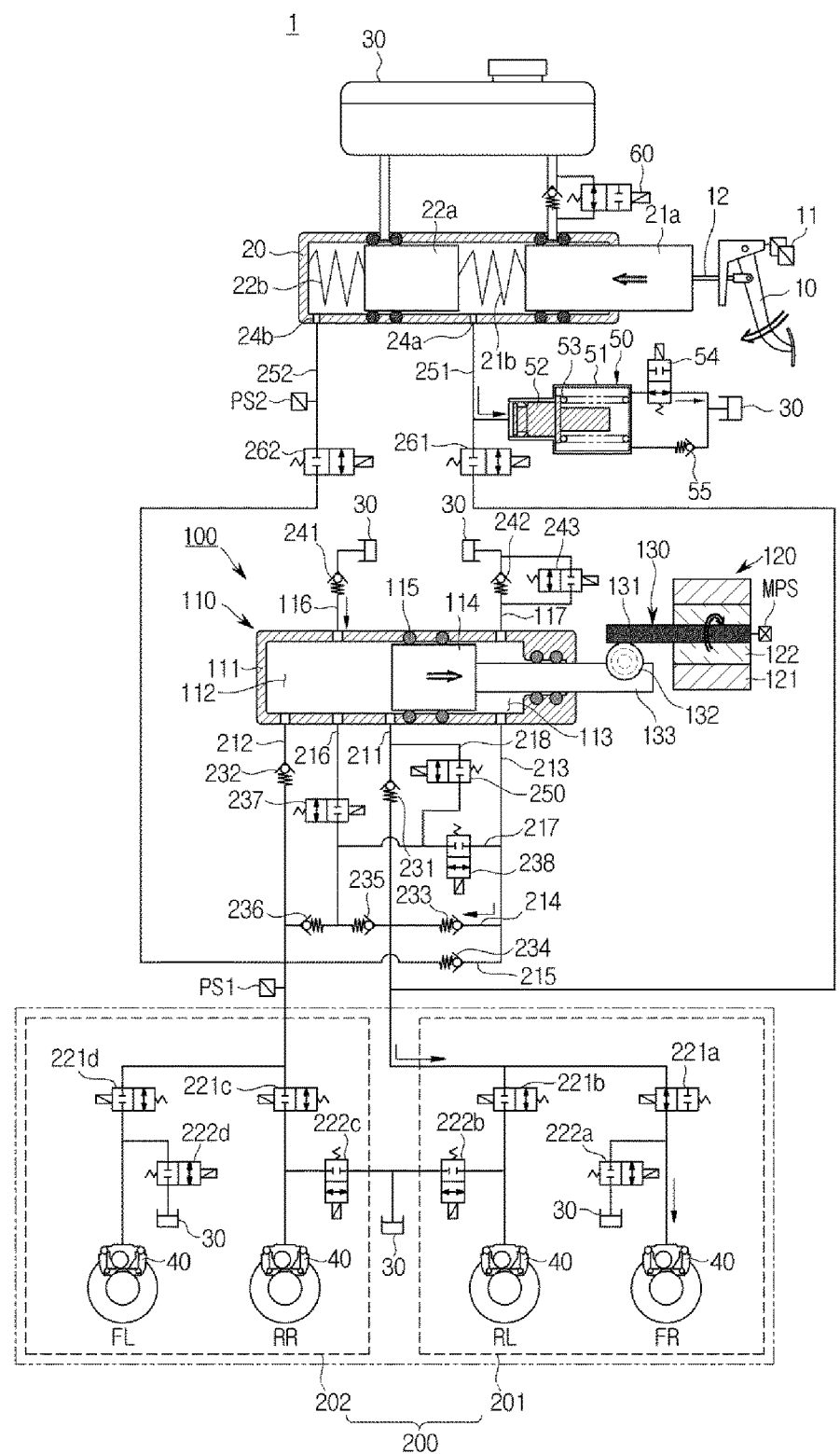

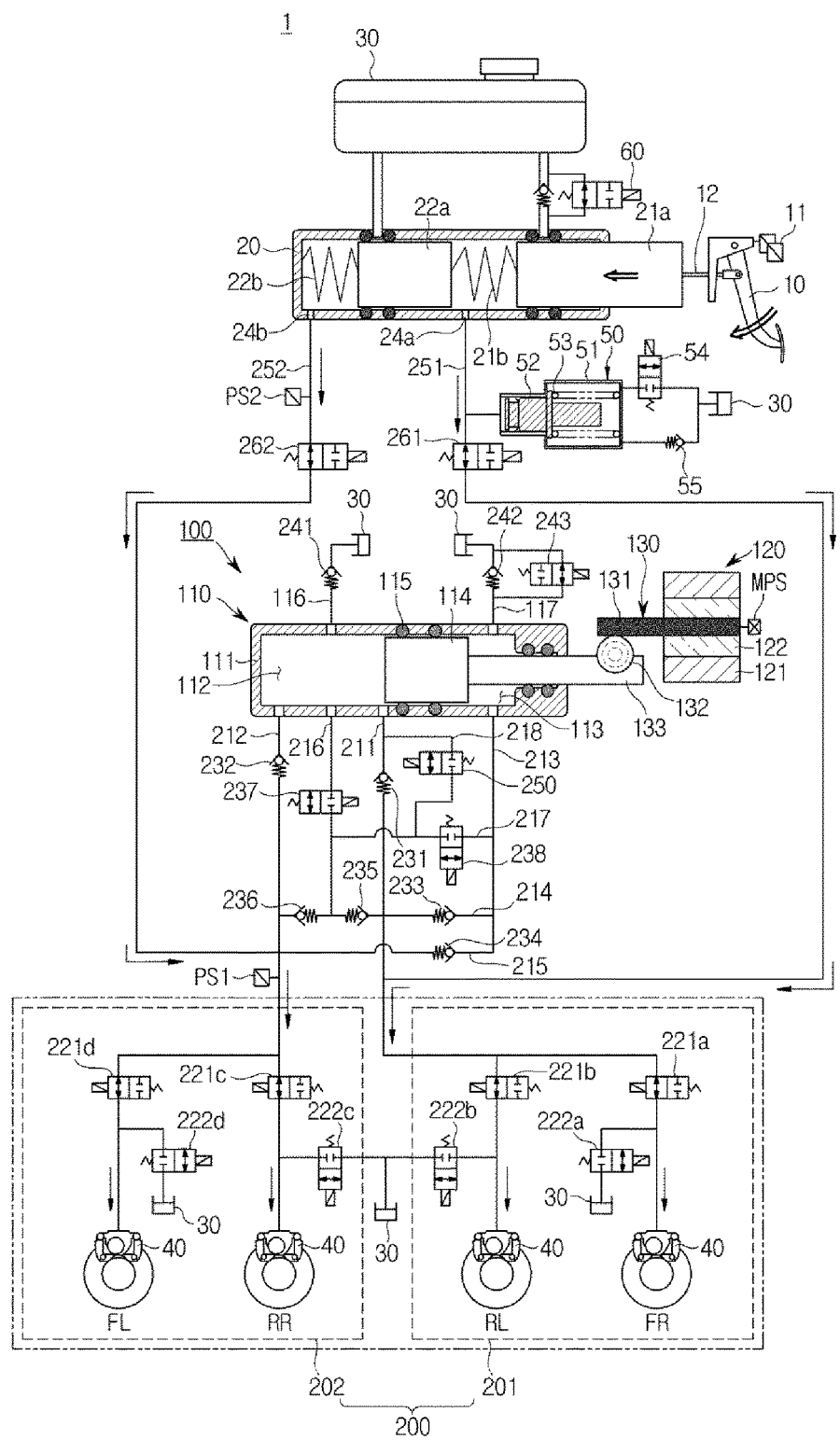
[Fig. 9]

[Fig. 10]
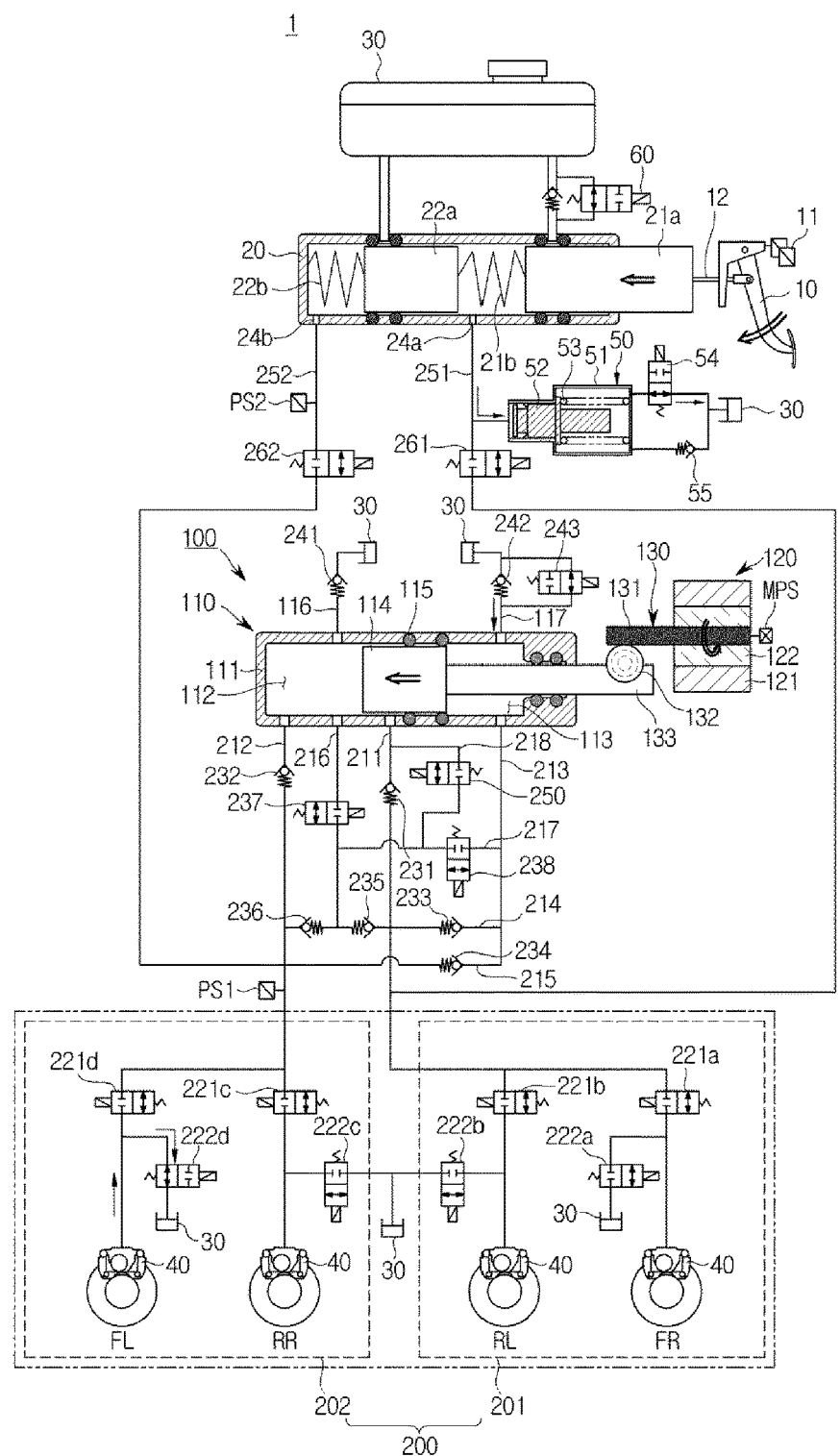

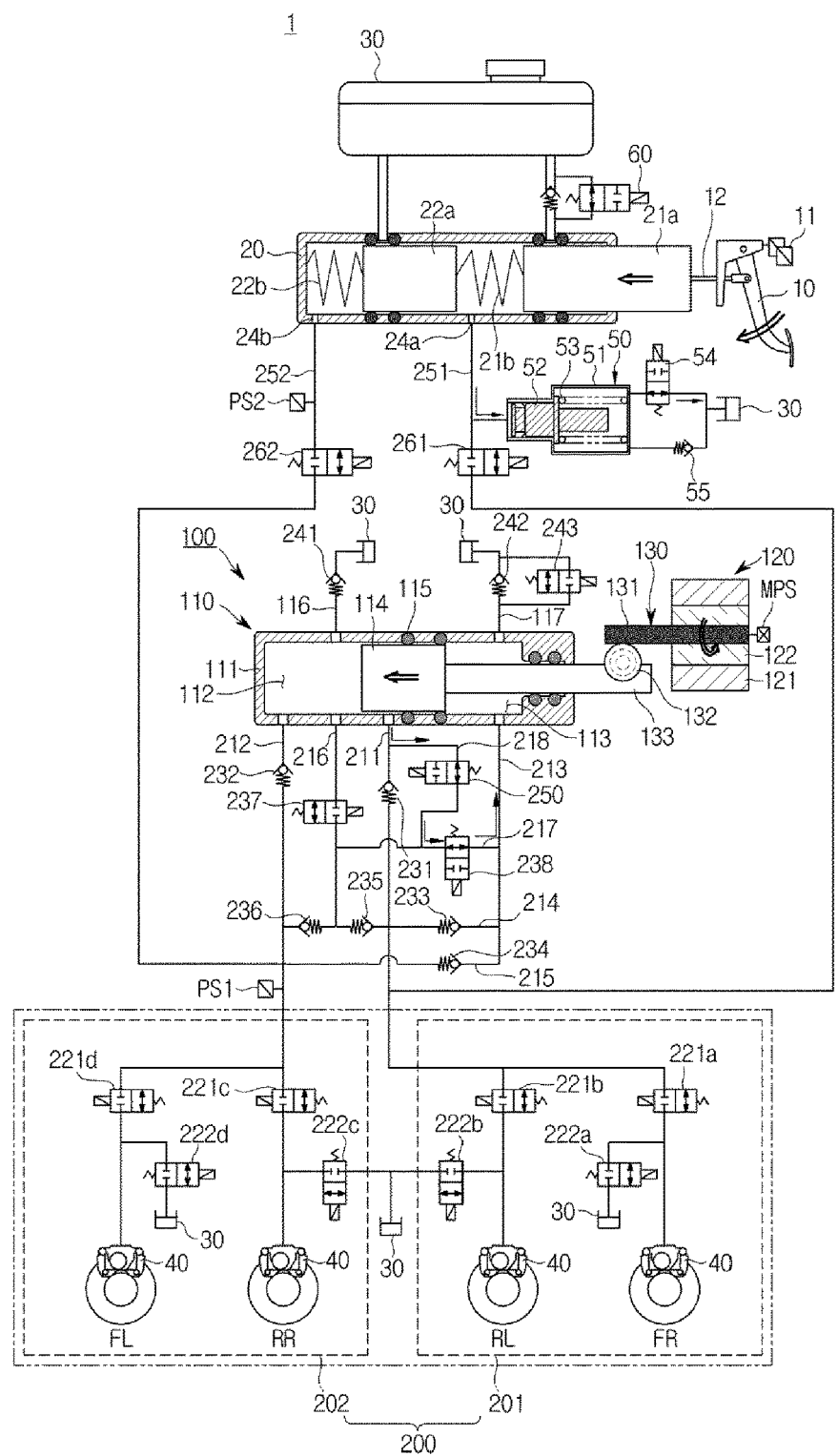
[Fig. 11]

[Fig. 12]
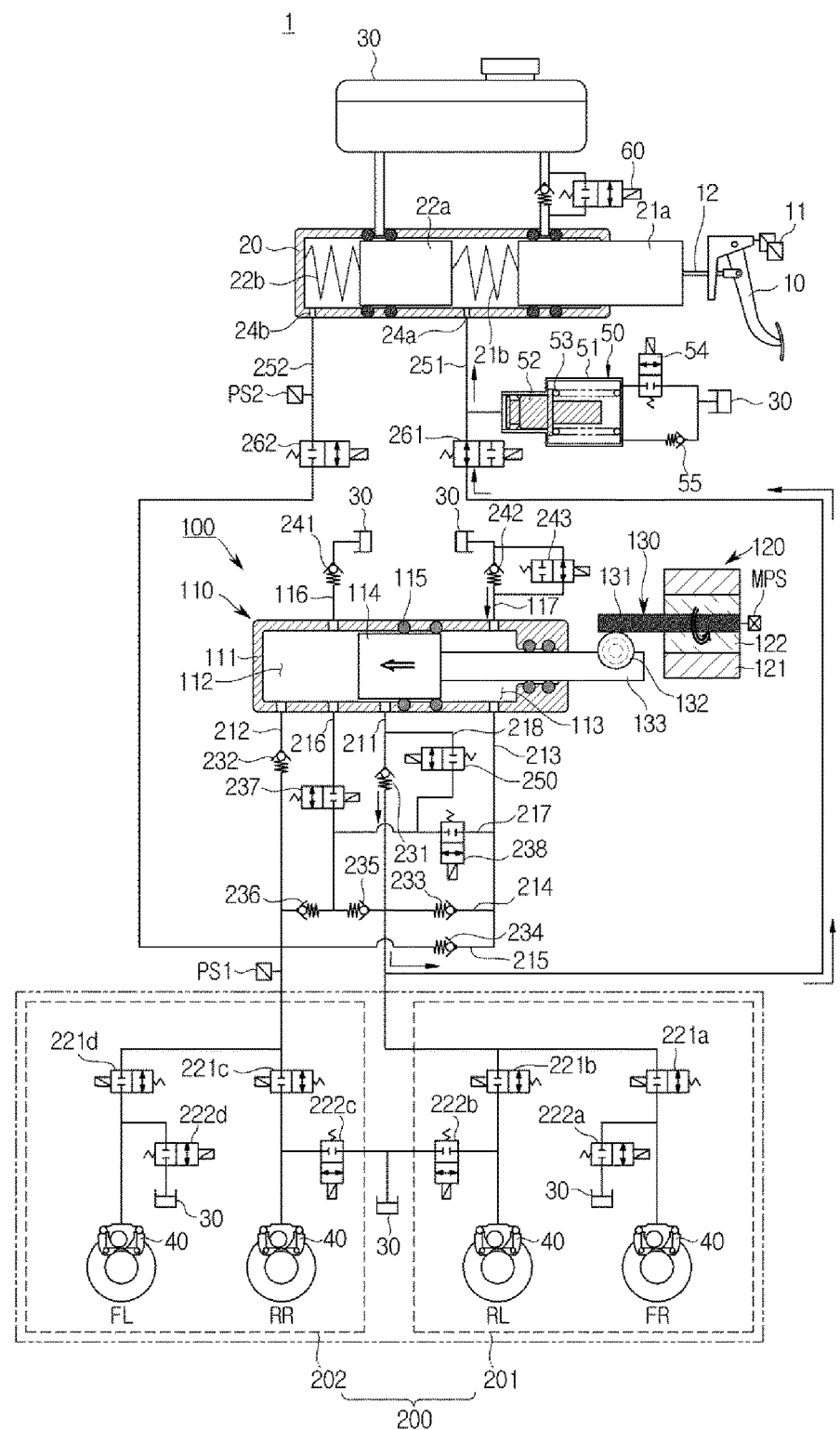

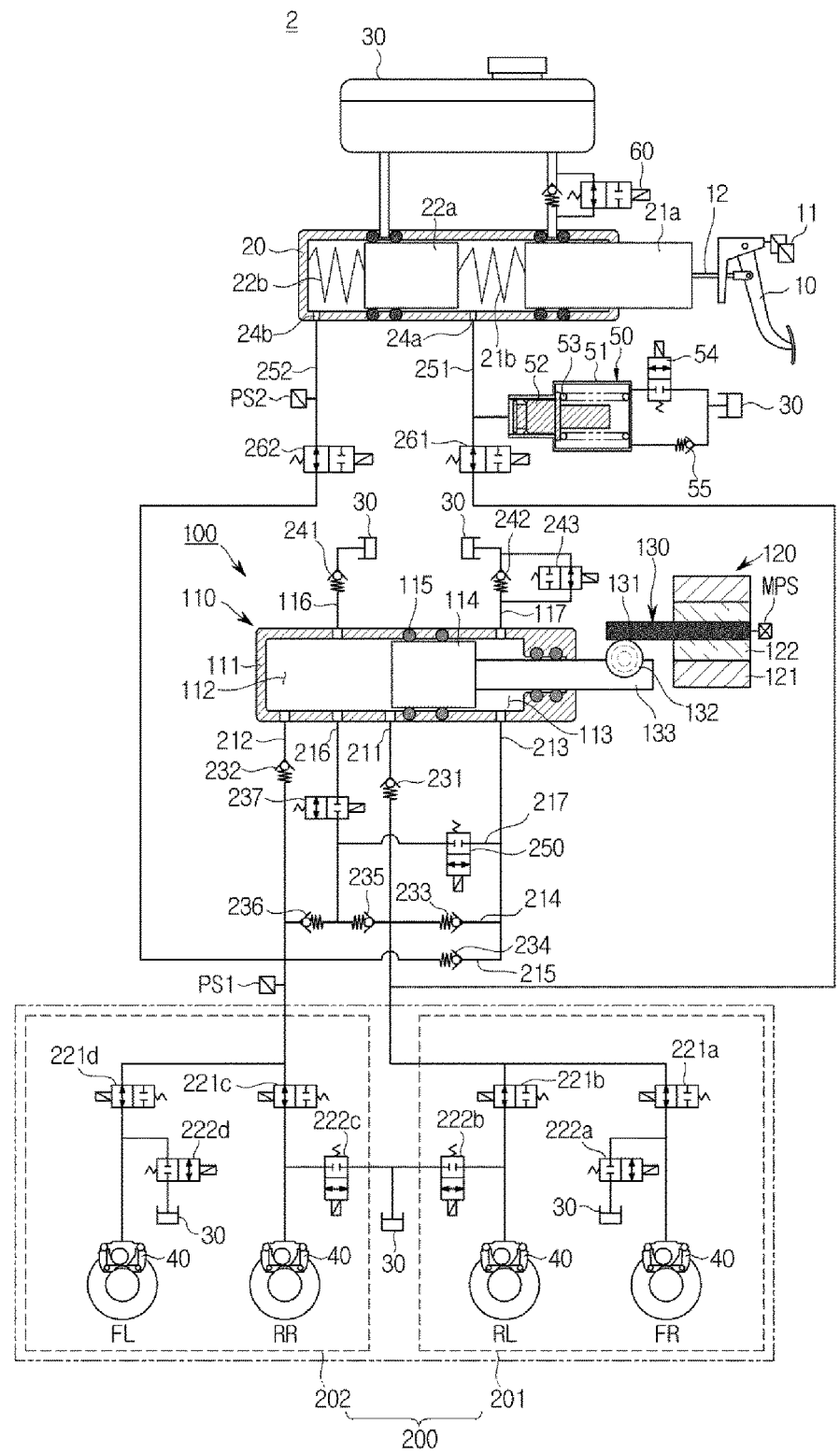
[Fig. 13]

[Fig. 14]
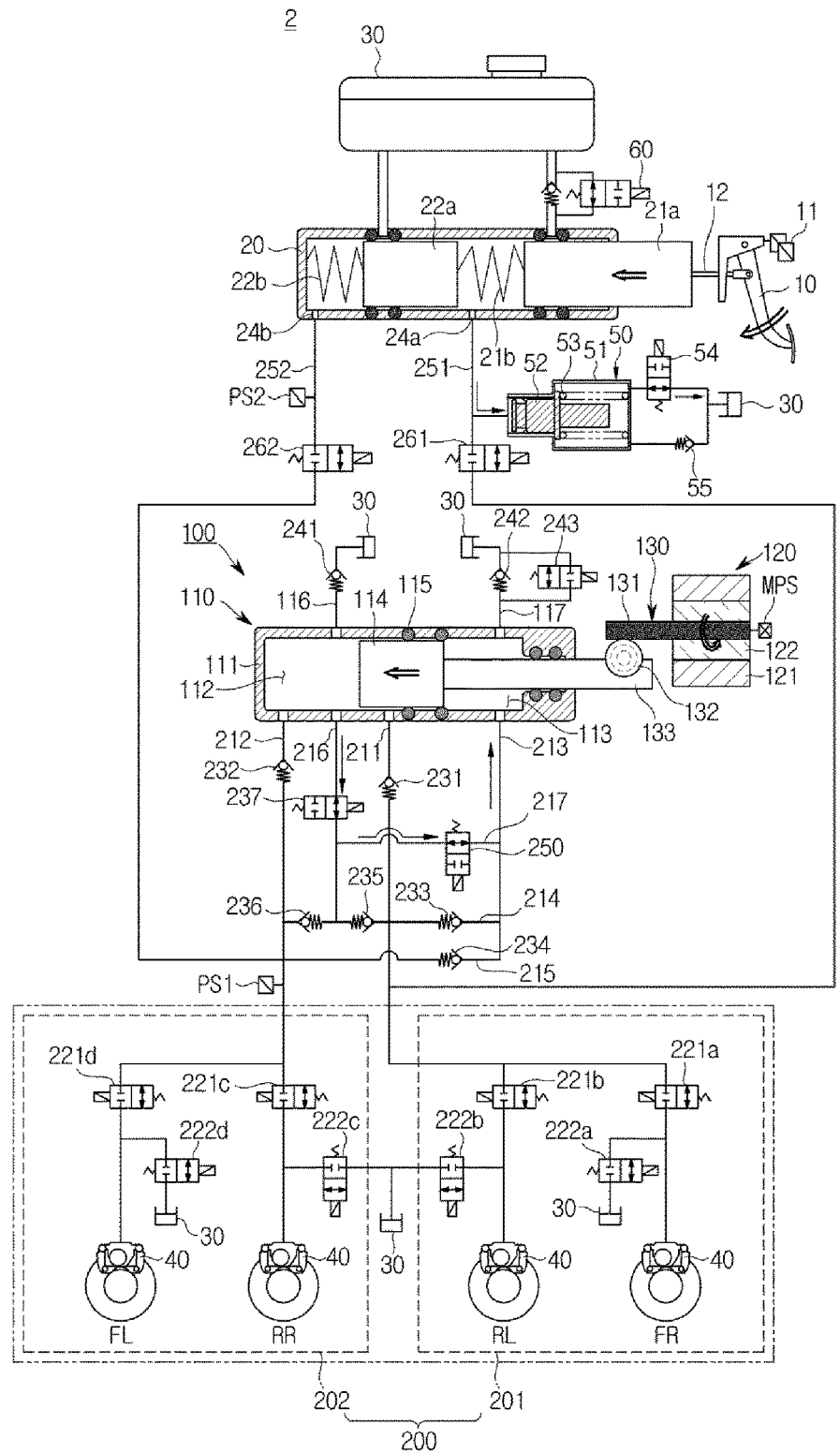

ELECTRIC BRAKE SYSTEM

This application claims the benefit of Korean Patent Application No. 2015-0162404, filed on Nov. 19, 2015 in the Korean Intellectual Property Office, the disclosure of which is incorporated herein by reference.

BACKGROUND

1. Field

Embodiments of the present disclosure relate to an electric brake system, and more particularly, to an electric brake system generating a braking force using an electrical signal corresponding to a displacement of a brake pedal.

2. Description of the Related Art

A brake system for braking is necessarily mounted on a vehicle, and a variety of systems for providing stronger and more stable braking have been proposed recently.

For example, there are brake systems including an anti-lock brake system (ABS) for preventing a wheel from sliding while braking, a brake traction control system (BTCS) for preventing a driving wheel from slipping when a vehicle is unintentionally or intentionally accelerated, an electronic stability control system (ESC) for stably maintaining a driving state of a vehicle by combining an ABS with traction control to control hydraulic pressure of a brake, and the like.

Generally, an electric brake system includes a hydraulic pressure supply device which receives a braking intent of a driver in the form of an electrical signal from a pedal displacement sensor which senses a displacement of a brake pedal when the driver steps on the brake pedal and then supplies hydraulic pressure to a wheel cylinder.

An electric brake system provided with such a hydraulic pressure supply device is disclosed in European Registered Patent No. EP 2 520 473. According to the disclosure in that document, the hydraulic pressure supply device is configured such that a motor is activated according to a pedal effort of a brake pedal to generate braking pressure. At this point, the braking pressure is generated by converting a rotational force of the motor into a rectilinear movement to pressurize a piston.

PRIOR ART DOCUMENT (Patent Document) European Registered Patent No. EP 2 520 473 A1 (Honda Motor Co., Ltd.), Nov. 7, 2012.

SUMMARY

Therefore, it is an aspect of the present disclosure to provide an electric brake system including a hydraulic pressure supply device that is operated with double action.

Additional aspects of the disclosure will be set forth in part in the description which follows and, in part, will be obvious from the description, or may be learned by practice of the disclosure.

In accordance with one aspect of the present invention, there may be provided an electric brake system, which comprises a hydraulic pressure supply device configured to generate hydraulic pressure using a piston which is operated by means of an electrical signal that is output corresponding to a displacement of a brake pedal, and including a first pressure chamber provided at one side of the piston being movably accommodated inside a cylinder block and connected to one or more wheel cylinders, and a second pressure chamber provided at the other side of the piston and connected to the one or more wheel cylinders, a first hydraulic flow path configured to communicate with the first pressure chamber and provide hydraulic pressure generated in the first pressure chamber to the one or more wheel cylinders, a second hydraulic flow path configured to communicate with the first pressure chamber and provide the hydraulic pressure generated in the first pressure chamber to the one or more wheel cylinders, a third hydraulic flow path configured to communicate with the second pressure chamber, branch at the middle of the third hydraulic flow path to be connected to each of the first hydraulic flow path and the second hydraulic flow path, and provide hydraulic pressure generated in the second pressure chamber to the one or more wheel cylinders, a sixth hydraulic flow path configured to communicate with the first pressure chamber, branch at the middle of the sixth hydraulic flow path to be connected to each of the first hydraulic flow path and the second hydraulic flow path, and deliver hydraulic pressure of the one or more wheel cylinders to the first pressure chamber, a seventh hydraulic flow path configured to connect the sixth hydraulic flow path to the third hydraulic flow path to deliver the hydraulic pressure of the one or more wheel cylinders to the second pressure chamber, a first control valve provided at the first hydraulic flow path and configured to control an oil flow, a second control valve provided at the second hydraulic flow path and configured to control an oil flow, a third control valve provided at the third hydraulic flow path and configured to control an oil flow, a seventh control valve provided at the sixth hydraulic flow path and configured to control an oil flow, an eighth control valve provided at the seventh hydraulic flow path and configured to control an oil flow, a first hydraulic circuit including first and second branching flow paths which branch from the first hydraulic flow path and are connected to two wheel cylinders, respectively, and first and second inlet valves which control the first and second branching flow paths, respectively, and a second hydraulic circuit including third and fourth branching flow paths which branch from the second hydraulic flow path and are connected to two wheel cylinders, respectively.

Also, one or more of the first and second control valves may be configured with a check valve that allows an oil flow in a direction from the hydraulic pressure supply device toward the one or more wheel cylinders and blocks an oil flow in a reverse direction.

Also, the third hydraulic flow path may include a fourth hydraulic flow path configured to branch at the middle of the third hydraulic flow path and connected to the first hydraulic flow path, and a fifth hydraulic flow path configured to branch at the middle of the third hydraulic flow path and connected to the second hydraulic flow path, the third control valve may be installed at the fourth hydraulic flow path, the electric brake system may further include a fourth control valve installed at the fifth hydraulic flow path and configured to control an oil flow, and the third control valve and the fourth control valve may be configured with a check valve that allows an oil flow in a direction from the hydraulic pressure supply device toward the one or more wheel cylinders and blocks an oil flow in a reverse direction.

Also, the seventh control valve may be installed at an upstream side of a position at which the sixth hydraulic flow path and the seventh hydraulic flow path are connected to each other.

Also, the seventh control valve may be configured with a solenoid valve configured to control bidirectionally an oil flow between the hydraulic pressure supply device and the one or more wheel cylinders.

Also, the seventh control valve may be a normally closed type valve that is usually closed and is open when an opening signal is received.

Also, the electric brake system may further include a fifth control valve configured to branch from the sixth hydraulic flow path, provided at a flow path connected to the first hydraulic flow path, and configured to control an oil flow, and a sixth control valve configured to branch from the sixth hydraulic flow path, provided at a flow path connected to the third hydraulic flow path, and configured to control an oil flow.

Also, one or more of the fifth and sixth control valves may be configured with a check valve that allows an oil flow in a direction from the one or more wheel cylinders toward the hydraulic pressure supply device and blocks an oil flow in a reverse direction.

Also, the electric brake system may further include an eighth hydraulic flow path configured to communicate the first pressure chamber with the second pressure chamber, and a balance valve provided at the eighth hydraulic flow path, configured to control bidirectionally an oil flow between the first pressure chamber and the second pressure chamber, and configured with a solenoid valve.

Also, the balance valve may be a normally closed type valve that is usually closed and is open when an opening signal is received.

Also, the eighth hydraulic flow path may connect an upstream side of the first control valve of the first hydraulic flow path to the seventh hydraulic flow path.

Also, the eighth control valve may be installed at the seventh hydraulic flow path, and the electric brake system may further include a balance valve that is configured with a normally closed type solenoid valve that is usually closed and is open when an opening signal is received.

Also, the electric brake system may further include a first dump flow path configured to communicate with the first pressure chamber and connected to a reservoir, a second dump flow path configured to communicate with the second pressure chamber and connected to the reservoir, a first dump valve provided at the first dump flow path, configured to control an oil flow, and configured with a check valve that allows an oil flow in a direction from the reservoir toward the first pressure chamber and blocks an oil flow in a reverse direction, a second dump valve provided at the second dump flow path, configured to control an oil flow, and configured with a check valve that allows an oil flow in a direction from the reservoir toward the second pressure chamber and blocks an oil flow in a reverse direction, and a third dump valve provided at a bypass flow path of the second dump flow path to connect an upstream side of the second dump valve to a downstream side thereof, configured to control an oil flow, and configured with a solenoid valve that bidirectionally controls an oil flow between the reservoir and the second pressure chamber.

Also, the third dump valve may be a normally opened type valve that is usually open and is closed when a closing signal is received.

Also, the hydraulic pressure supply device may further include the cylinder block, the piston movably accommodated inside the cylinder block and configured to perform a reciprocal movement by means of a rotational force of a motor, a first communicating hole formed at the cylinder block forming the first pressure chamber and configured to communicate with the first hydraulic flow path, a second communicating hole formed at the cylinder block forming the first pressure chamber and configured to communicate with the second hydraulic flow path, and a third communicating hole formed at the cylinder block forming the second pressure chamber and configured to communicate with the third hydraulic flow path.

In accordance with another aspect of the present invention, there is provided an electric brake system, which comprises a hydraulic pressure supply device including a motor configured to operate in response to an electrical signal that is output corresponding to a displacement of a brake pedal, a power conversion unit configured to convert a rotational force of the motor into a rectilinear movement, a cylinder block, a piston connected to the power conversion unit and movably accommodated inside the cylinder block, a first pressure chamber provided at one side of the piston and connected to one or more wheel cylinders, and a second pressure chamber provided at the other side of the piston and connected to the one or more wheel cylinders, a first hydraulic flow path configured to communicate with the first pressure chamber and provide hydraulic pressure generated at the first pressure chamber to the one or more wheel cylinders, a second hydraulic flow path configured to communicate with the first pressure chamber and provide the hydraulic pressure generated at the first pressure chamber to the one or more wheel cylinders, a third hydraulic flow path configured to communicate with the second pressure chamber, configured to branch at the middle of the third hydraulic flow path to be connected to the first hydraulic flow path and the second hydraulic flow path, and configured to provide hydraulic pressure generated at the second pressure chamber to the one or more wheel cylinders, a sixth hydraulic flow path configured to communicate with the first pressure chamber, configured to branch at the middle of the sixth hydraulic flow path to be connected to each of the first hydraulic flow path and the second hydraulic flow path, and configured to provide hydraulic pressure of the one or more wheel cylinders to the first pressure chamber, a seventh hydraulic flow path configured to communicate with the second pressure chamber, configured to branch at the middle of the seventh hydraulic flow path to be connected to each of the first hydraulic flow path and the second hydraulic flow path, and configured to provide the hydraulic pressure of the one or more wheel cylinders to the second pressure chamber, a first control valve provided at the first hydraulic flow path and configured to control an oil flow, a second control valve provided at the second hydraulic flow path and configured to control an oil flow, a third control valve provided at the third hydraulic flow path and configured to control an oil flow, a seventh control valve provided at the sixth hydraulic flow path and configured to control an oil flow, an eighth control valve provided at the seventh hydraulic flow path and configured to control an oil flow, a first hydraulic circuit including first and second branching flow paths which branch from the first hydraulic flow path and are connected to two wheel cylinders, respectively, and first and second inlet valves which control the first and second branching flow paths, respectively, a second hydraulic circuit including third and fourth branching flow paths which branch from the second hydraulic flow path and are connected to two wheel cylinders, respectively, and an electronic control unit (ECU) configured to control an operation of the motor, and opening and closing of the seventh and eighth control valves, the first and second inlet valves, and third and fourth inlet valves.

Also, the ECU may generate the hydraulic pressure in the first pressure chamber by moving the piston forward at an initial stage of braking, open the first to fourth inlet valves to provide the hydraulic pressure generated in the first pressure chamber to the one or more wheel cylinders, move the piston backward to generate the hydraulic pressure in the second pressure chamber when the piston is moved forward to arrive at a predetermined position, close the seventh control valve to prevent the hydraulic pressure of the one or more wheel cylinders from being discharged due to negative pressure generated in the first pressure chamber, and allow the hydraulic pressure generated in the second pressure chamber to be additionally provided to the one or more wheel cylinders through the first to fourth inlet valves which are open.

Also, the hydraulic pressure provided to the one or more wheel cylinders while the piston is moved backward may be greater than the hydraulic pressure provided to the one or more wheel cylinders while the piston is maximally moved forward.

Also, when braking is released, the ECU may move the piston backward to generate the negative pressure in the first pressure chamber and open the first to fourth inlet valves and the seventh control valve to allow oil of the one or more wheel cylinders to flow into the first pressure chamber, or move the piston forward to generate negative pressure in the second pressure chamber and open the first to fourth inlet valves and the eighth control valve to allow the oil of the one or more wheel cylinders to flow into the second pressure chamber.

Also, the electric brake system may further include an eighth hydraulic flow path configured to communicate with the first pressure chamber and the second pressure chamber, and a balance valve provided at the eighth hydraulic flow path and configured to control an oil flow, wherein, when an imbalance in pressure between the first pressure chamber and the second pressure chamber occurs, the ECU may open the balance valve to accomplish a balance in pressure between the first pressure chamber and the second pressure chamber.

BRIEF DESCRIPTION OF THE DRAWINGS

FIG. 1 is a hydraulic circuit diagram illustrating a non-braking state of an electric brake system according to one embodiment of the present disclosure.

FIG. 2 is an enlarged diagram illustrating a hydraulic pressure supply unit according to one embodiment of the present disclosure.

FIGS. 3 and 4 show a state in which the electric brake system according to one embodiment of the present disclosure performs a braking operation normally, FIG. 3 is a hydraulic circuit diagram illustrating a situation in which braking pressure is provided while a hydraulic piston is moved forward, and FIG. 4 is a hydraulic circuit diagram illustrating a situation in which braking pressure is provided while the hydraulic piston is moved backward.

FIGS. 5 and 6 show a state in which a braking force is released when the electric brake system according to one embodiment of the present disclosure operates normally, FIG. 5 is a hydraulic circuit diagram illustrating a situation in which braking pressure is released while the hydraulic piston is moved backward, and FIG. 6 is a hydraulic circuit diagram illustrating a situation in which braking pressure is released while the hydraulic piston is moved forward.

FIGS. 7 and 8 show a state in which an anti-lock brake system (ABS) is operated through the electric brake system according to one embodiment of the present disclosure, FIG. 7 is a hydraulic circuit diagram illustrating a situation in which the hydraulic piston is moved forward and selective braking is performed, and FIG. 8 is a hydraulic circuit diagram illustrating a situation in which the hydraulic piston is moved backward and selective braking is performed.

FIG. 9 is a hydraulic circuit diagram illustrating a situation in which the electric brake system according to one embodiment of the present disclosure operates abnormally.

FIG. 10 is a hydraulic circuit diagram illustrating a state in which the electric brake system according to one embodiment of the present disclosure operates in a dump mode.

FIG. 11 is a hydraulic circuit diagram illustrating a state in which the electric brake system according to one embodiment of the present disclosure operates in a balance mode.

FIG. 12 is a hydraulic circuit diagram illustrating a state in which the electric brake system according to one embodiment of the present disclosure operates in an inspection mode.

FIG. 13 is a hydraulic circuit diagram illustrating a non-braking state of an electric brake system according to another embodiment of the present disclosure.

FIG. 14 is a hydraulic circuit diagram illustrating a state in which the electric brake system according to another embodiment of the present disclosure operates in a balance mode.

DETAILED DESCRIPTION

Hereinafter, embodiments of the present disclosure will be described in detail with reference to the accompanying drawings. The embodiments to be described below are provided to fully convey the spirit of the present disclosure to a person skilled in the art. The present disclosure is not limited to the embodiments disclosed herein and may be implemented in other forms. In the drawings, some portions not related to the description will be omitted and will not be shown in order to clearly describe the present disclosure, and also a size of a component may be somewhat exaggerated to help understanding.

FIG. 1 is a hydraulic circuit diagram illustrating a non-braking state of an electric brake system 1 according to one embodiment of the present disclosure.

Referring to FIG. 1, the electric brake system 1 generally includes a master cylinder 20 for generating hydraulic pressure, a reservoir 30 coupled to an upper part of the master cylinder 20 to store oil, an input rod 12 for pressurizing the master cylinder 20 according to a pedal effort of a brake pedal 10, a wheel cylinder 40 for receiving the hydraulic pressure to perform braking of each of wheels RR, RL, FR, and FL, a pedal displacement sensor 11 for sensing a displacement of the brake pedal 10, and a simulation device 50 for providing a reaction force according to the pedal effort of the brake pedal 10.

The master cylinder 20 may be configured to include at least one chamber to generate hydraulic pressure. As one example, the master cylinder 20 may be configured to include two chambers, a first piston 21a and a second piston 22a may be provided at the two chambers, respectively, and the first piston 21a may be connected to the input rod 12. Further, the master cylinder 20 may include first and second hydraulic ports 24a and 24b which are formed thereon and through which hydraulic pressure is delivered from each of the two chambers.

Meanwhile, the master cylinder 20 may include two chambers to secure safety when one chamber fails. For example, one of the two chambers may be connected to a front right wheel FR and a rear left wheel RL of a vehicle, and the remaining chamber may be connected to a front left wheel FL and a rear right wheel RR thereof. As described above, the two chambers may be independently configured so that braking of the vehicle may be possible even when one of the two chambers fails.

Alternatively, unlike shown in the drawing, one of the two chambers may be connected to two front wheels FR and FL and the remaining chamber may be connected to two rear wheels RR and RL. In addition to the described above, one of the two chambers may be connected to the front left wheel FL and the rear left wheel RL, and the remaining chamber may be connected to the rear right wheel RR and the front right wheel FR. In other words, a variety of connected configurations may be established between the chambers of the master cylinder 20 and the wheels.

Further, a first spring 21b may be provided between the first piston 21a and the second piston 22a of the master cylinder 20, and a second spring 22b may be provided between the second piston 22a and an end of the master cylinder 20.

The first spring 21b and the second spring 22b are provided at the two chambers, respectively, to store an elastic force when the first piston 21a and the second piston 22a are compressed according to a variance of a displacement of the brake pedal 10. Further, when a force pushing the first piston 21a is less than the elastic force, the first spring 21b and the second spring 22b may use the stored elastic force to push the first and second pistons 21a and 22a and return the first and second pistons 21a and 22a to their original positions, respectively.

Meanwhile, the input rod 12 compressing the first piston 21a of the master cylinder 20 may come into close contact with the first piston 21a. In other words, no gap may exist between the master cylinder 20 and the input rod 12. Consequently, when the brake pedal 10 is stepped on, the master cylinder 20 may be directly pressurized without a pedal dead stroke section.

The simulation device 50 may be connected to a first backup flow path 251, which will be described below, to provide a reaction force according to a pedal effort of the brake pedal 10. The reaction force may be provided to compensate for a pedal effort provided from a driver such that a braking force may be finely controlled as intended by the driver.

Referring to FIG. 1, the simulation device 50 includes a simulation chamber 51 provided to store oil flowing from the first hydraulic port 24a of the master cylinder 20, a reaction force piston 52 provided inside the simulation chamber 51, a pedal simulator provided with a reaction force spring 53 elastically supporting the reaction force piston 52, and a simulator valve 54 connected to a rear end part of the simulation chamber 51.

The reaction force piston 52 and the reaction force spring 53 are respectively installed to have a predetermined range of displacement within the simulation chamber 51 by means of oil flowing therein.

Meanwhile, the reaction force spring 53 shown in the drawing is merely one embodiment capable of providing an elastic force to the reaction force piston 52, and thus it may include numerous embodiments capable of storing the elastic force through shape deformation. As one example, the reaction force spring 53 includes a variety of members which are configured with a material including rubber and the like and have a coil or plate shape, thereby being able to store an elastic force.

The simulator valve 54 may be provided at a flow path connecting a rear end of the simulation chamber 51 to the reservoir 30. A front end of the simulation chamber 51 may be connected to the master cylinder 20, and the rear end of the simulation chamber 51 may be connected to the reservoir 30 through the simulator valve 54. Therefore, even when the reaction force piston 52 returns, oil inside the reservoir 30 may flow through the simulator valve 54 so that an inside of the simulation chamber 51 is entirely filled with the oil.

Meanwhile, a plurality of reservoirs 30 are shown in the drawing, and the same reference number is assigned to each of the plurality of reservoirs 30. These reservoirs may be configured with the same components, and may alternatively be configured with different components. As one example, the reservoir 30 connected to the simulation device 50 may be the same as the reservoir 30 connected to the master cylinder 20, or may be a storage part capable of storing oil in separation from the reservoir 30 connected to the master cylinder 20.

Meanwhile, the simulator valve 54 may be configured with a normally closed type solenoid valve usually maintaining a closed state. When the driver applies a pedal effort to the brake pedal 10, the simulator valve 54 may be opened to deliver oil inside the simulation chamber 51 to the reservoir 30.

Also, a simulator check valve 55 may be installed to be connected in parallel with the simulator valve 54 between the pedal simulator and the reservoir 30. The simulator check valve 55 may allow the oil inside the reservoir 30 to flow toward the simulation chamber 51 and may block the oil inside the simulation chamber 51 from flowing toward the reservoir 30 through a flow path at which the simulator check valve 55 is installed. When the pedal effort of the brake pedal 10 is released, the oil may be provided inside the simulation chamber 51 through the simulator check valve 55 to ensure a rapid return of pressure of the pedal simulator.

To describe an operating process of the simulation device 50, when the driver applies a pedal effort to the brake pedal 10, the oil inside the simulation chamber 51, which is pushed by the reaction force piston 52 of the pedal simulator while the reaction force piston 52 compresses the reaction force spring 53, is delivered to the reservoir 30 through the simulator valve 54, and then a pedal feeling is provided to the driver through such an operation. Further, when the driver releases the pedal effort from the brake pedal 10, the reaction force spring 53 may push the reaction force piston 52 to return the reaction force piston 52 to its original state, and the oil inside the reservoir 30 may flow into the simulation chamber 51 through the flow path at which the simulator valve 54 is installed and the flow path at which the simulator check valve 55 is installed, thereby completely filling the inside of the simulation chamber 51 with the oil.

As described above, because the inside of the simulation chamber 51 is in a state in which the oil is filled therein at all times, friction of the reaction force piston 52 is minimized when the simulation device 50 is operated, and thus durability of the simulation device 50 may be improved and also introduction of foreign materials from the outside may be blocked.

The electric brake system 1 according to one embodiment of the present disclosure may include a hydraulic pressure supply device 100 which is mechanically operated by receiving a braking intent of the driver in the form of an electrical signal from the pedal displacement sensor 11 measuring a displacement of the brake pedal 10, a hydraulic control unit 200 configured with first and second hydraulic circuits 201 and 202, each of which is provided at two wheels, and controlling a hydraulic pressure flow delivered to the wheel cylinder 40 that is provided at each of the wheels RR, RL, FR, and FL, a first cut valve 261 provided at the first backup flow path 251 connecting the first hydraulic port 24a to the first hydraulic circuit 201 to control a hydraulic pressure flow, a second cut valve 262 provided at a second backup flow path 252 connecting the second hydraulic port 24b to the second hydraulic circuit 202 to control a hydraulic pressure flow, and an electronic control unit (ECU) (not shown) controlling the hydraulic pressure supply device 100 and valves 54, 60, 221a, 221b, 221c, 221d, 222a, 222b, 222c, 222d, 237, 238, 243, and 250 on the basis of hydraulic pressure information and pedal displacement information.

The hydraulic pressure supply device 100 may include a hydraulic pressure supply unit 110 for providing oil pressure delivered to the wheel cylinder 40, a motor 120 for generating a rotational force in response to an electrical signal of the pedal displacement sensor 11, and a power conversion unit 130 for converting a rotational movement of the motor 120 into a rectilinear movement and transmitting the rectilinear movement to the hydraulic pressure supply unit 110. Alternatively, the hydraulic pressure supply unit 110 may be operated by means of pressure provided from a high pressure accumulator instead of a driving force supplied from the motor 120.

Next, the hydraulic pressure supply unit 110 according to one embodiment of the present disclosure will be described with reference to FIG. 2. FIG. 2 is an enlarged diagram illustrating the hydraulic pressure supply unit 110 according to one embodiment of the present disclosure.

The hydraulic pressure supply unit 110 includes a cylinder block 111 in which a pressure chamber for receiving and storing oil therein is formed, a hydraulic piston 114 accommodated in the cylinder block 111, a sealing member 115 (that is, 115a and 115b) provided between the hydraulic piston 114 and the cylinder block 111 to seal the pressure chamber, and a drive shaft 133 connected to a rear end of the hydraulic piston 114 to deliver power output from the power conversion unit 130 to the hydraulic piston 114.

The pressure chamber may include a first pressure chamber 112 located at a front side (in a forward movement direction, that is, a leftward direction of the drawing) of the hydraulic piston 114, and a second pressure chamber 113 located at a rear side (in a backward movement direction, that is, a rightward direction of the drawing) of the hydraulic piston 114.

In other words, the first pressure chamber 112 is comparted by means of the cylinder block 111 and a front end of the hydraulic piston 114 and is provided to have a volume that varies according to movement of the hydraulic piston 114, and the second pressure chamber 113 is comparted by means of the cylinder block 111 and the rear end of the hydraulic piston 114 and is provided to have a volume that varies according to the movement of the hydraulic piston 114.

The first pressure chamber 112 is connected to a first hydraulic flow path 211 through a first communicating hole 111a formed at a rear side of the cylinder block 111, and is connected to a second hydraulic flow path 212 through a second communicating hole 111b formed at a front side of the cylinder block 111. The first hydraulic flow path 211 connects the hydraulic pressure supply unit 110 to the first hydraulic circuit 201, and the second hydraulic flow path 212 connects the hydraulic pressure supply unit 110 to the second hydraulic circuit 202.

The sealing member 115 includes a piston sealing member 115a provided between the hydraulic piston 114 and the cylinder block 111 to seal between the first pressure chamber 112 and the second pressure chamber 113, and a piston rod sealing member 115b provided between the drive shaft 133 and the cylinder block 111 to seal openings of the second pressure chamber 113 and the cylinder block 111. In other words, hydraulic pressure or negative pressure of the first pressure chamber 112, which is generated while the hydraulic piston 114 is moved forward or backward, may be blocked by the piston sealing member 115a and may be delivered to the first and second hydraulic flow paths 211 and 212 without leaking into the second pressure chamber 113. Further, hydraulic pressure or negative pressure of the second pressure chamber 113, which is generated while the hydraulic piston 114 is moved forward or backward, may be blocked by the piston rod sealing member 115b and may not be leaked into the cylinder block 111.

The first and second pressure chambers 112 and 113 may be respectively connected to the reservoir 30 by means of dump flow paths 116 and 117, and receive and store oil supplied from the reservoir 30 or deliver oil inside the first or second pressure chamber 112 or 113 to the reservoir 30. As one example, the dump flow paths 116 and 117 may include a first dump flow path 116 branching from the first pressure chamber 112 and connected to the reservoir 30, and a second dump flow path 117 branching from the second pressure chamber 113 and connected to the reservoir 30.

Also, the first pressure chamber 112 may be connected to the first dump flow path 116 through a fifth communicating hole 111e formed at a front side, and the second pressure chamber 113 may be connected to the second dump flow path 117 through a sixth communicating hole 111f formed at a rear side.

Referring back to FIG. 1, flow paths 211, 212, 213, 214, 215, 216, 217, and 218, and valves 231, 232, 233, 234, 235, 236, 237, 238, 241, 242, and 243, which are connected to the first pressure chamber 112 and the second pressure chamber 113, will be described.

The first communicating hole 111a communicating with the first hydraulic flow path 211 may be formed at the front side of the first pressure chamber 112, the second communicating hole 111b communicating with the second hydraulic flow path 212 may be formed at the rear side of the first pressure chamber 112, and a fourth communicating hole 111d communicating with a sixth hydraulic flow path 216 may be formed between the first communicating hole 111a and the second communicating hole 111b. Further, the fifth communicating hole 111e communicating with the first dump flow path 116 may be further formed at the first pressure chamber 112.

Also, a third communicating hole 111c communicating with a third hydraulic flow path 213 and the sixth communicating hole 111f communicating with the second dump flow path 117 may be formed at the second pressure chamber 113.

The first hydraulic flow path 211 may communicate with the first hydraulic circuit 201, and the second hydraulic flow path 212 may communicate with the second hydraulic circuit 202. Therefore, hydraulic pressure may be delivered to the first hydraulic circuit 201 and the second hydraulic circuit 202 while the hydraulic piston 114 is moved forward.

Also, the electric brake system 1 according to one embodiment of the present disclosure may include a first control valve 231 and a second control valve 232 which are provided at the first and second hydraulic flow paths 211 and 212, respectively, to control an oil flow.

Further, the first and second control valves 231 and 232 may be provided as a check valve that allows only an oil flow in a direction from the first pressure chamber 112 toward the first or second hydraulic circuit 201 or 202 and blocks an oil flow in a reverse direction. That is, the first or second control valve 231 or 232 may allow the hydraulic pressure of the first pressure chamber 112 to be delivered to the first or second hydraulic circuit 201 or 202, and prevent the hydraulic pressure of the first or second hydraulic circuit 201 or 202 from leaking into the first pressure chamber 112 through the first or second hydraulic flow path 211 or 212.

Meanwhile, the third hydraulic flow path 213 may branch at the middle thereof into a fourth hydraulic flow path 214 and a fifth hydraulic flow path 215 to communicate with all the first hydraulic circuit 201 and the second hydraulic circuit 202. As one example, the fourth hydraulic flow path 214 branching from the third hydraulic flow path 213 may communicate with the first hydraulic circuit 201, and the fifth hydraulic flow path 215 branching from the third hydraulic flow path 213 may communicate with the second hydraulic circuit 202. Consequently, the hydraulic pressure may be delivered to all the first hydraulic circuit 201 and the second hydraulic circuit 202 while the hydraulic piston 114 is moved backward.

Also, the electric brake system 1 according to one embodiment of the present disclosure may include a third control valve 233 provided at the fourth hydraulic flow path 214 to control an oil flow, and a fourth control valve 234 provided at the fifth hydraulic flow path 215 to control an oil flow.

Further, the third and fourth control valves 233 and 234 may be configured with a check valve that allows only an oil flow in a direction from the second pressure chamber 113 toward the first or second hydraulic circuit 201 or 202, and blocks an oil flow in a reverse direction. That is, the third or fourth control valve 233 or 234 may allow the hydraulic pressure of the second pressure chamber 113 to be delivered to the first or second hydraulic circuit 201 or 202, and may prevent the hydraulic pressure of the first or second hydraulic circuit 201 or 202 from leaking into the second pressure chamber 113 through the third hydraulic flow path 213.

Meanwhile, the sixth hydraulic flow path 216 may branch at the middle thereof to communicate with all the first hydraulic flow path 211 and the second hydraulic flow path 212. Further, the hydraulic pressure of the first and second hydraulic circuits 201 and 202 may be returned to the first pressure chamber 112 through the sixth hydraulic flow path 216. That is, while the hydraulic piston 114 is moved backward, the sixth hydraulic flow path 216 may allow the hydraulic pressure of the first and second hydraulic circuits 201 and 202 to be returned to the first pressure chamber 112.

Also, a fifth control valve 235 may be installed at a flow path connecting the first hydraulic flow path 211 to the sixth hydraulic flow path 216, and a sixth control valve 236 may be installed at a flow path connecting the second hydraulic flow path 212 to the sixth hydraulic flow path 216.

Further, the fifth and sixth control valves 235 and 236 may be configured with a check valve that allow only an oil flow in a direction from the first or second hydraulic circuit 201 or 202 toward the first pressure chamber 112 and blocks an oil flow in a reverse direction. That is, the fifth or sixth control valve 235 or 236 may allow the hydraulic pressure of the first or second hydraulic circuit 201 or 202 to be delivered to the first pressure chamber 112, and may prevent the hydraulic pressure of the first pressure chamber 112 from leaking into the first or second hydraulic circuit 201 or 202 through the sixth hydraulic flow path 216.

Also, the electric brake system 1 according to one embodiment of the present disclosure may further include a seventh control valve 237 that is provided at an upstream side of a position at which the sixth hydraulic flow path 216 branches and controls an oil flow between the first pressure chamber 112 and the first and second hydraulic circuits 201 and 202. That is, the seventh control valve 237 is located between the first pressure chamber 112 and the fifth and sixth control valves 235 and 236.

While the hydraulic piston 114 is moved backward, two operations may be performed. First, using the negative pressure generated in the first pressure chamber 112, the oil in the first and second hydraulic circuits 201 and 202 may be returned to the first pressure chamber 112 to release a braking force. Second, using the hydraulic pressure generated in the second pressure chamber 113, the oil in the second pressure chamber 113 may be delivered to the first and second hydraulic circuits 201 and 202 through the third to fifth hydraulic flow paths 213, 214, and 215 to apply a braking force.

The seventh control valve 237 controls an oil flow of the sixth hydraulic flow path 216 to enable a selection of the above described two operations. That is, when the seventh control valve 237 opens the sixth hydraulic flow path 216, the oil in the first and second hydraulic circuits 201 and 202 may be returned to the first pressure chamber 112 to release a braking force. On the other hand, when the seventh control valve 237 blocks the sixth hydraulic flow path 216, the oil in the second pressure chamber 113 may be delivered to the first and second hydraulic circuits 201 and 202 to apply a braking force.

Further, the seventh control valve 237 may be configured with a solenoid valve capable of controlling a bidirectional flow, and with a normally closed type solenoid valve that is usually closed and is open when an opening signal is received from the ECU.

Also, the electric brake system 1 according to one embodiment of the present disclosure may further include an eighth control valve 238 that is provided at a seventh hydraulic flow path 217 communicating the third hydraulic flow path 213 with the sixth hydraulic flow path 216 and controls an oil flow between the second pressure chamber 113 and the first and second hydraulic circuits 201 and 202. That is, the eighth control valve 238 is located between the second pressure chamber 113 and the fifth and sixth control valves 235 and 236.

While the hydraulic piston 114 is moved forward, two operations may be performed. First, using the negative pressure generated in the second pressure chamber 113, the oil in the first and second hydraulic circuits 201 and 202 may be returned to the second pressure chamber 113 to release a braking force. Second, using the hydraulic pressure generated in the first pressure chamber 112, the oil in the first pressure chamber 112 may be delivered to the first and second hydraulic circuits 201 and 202 through the first and second hydraulic flow paths 211 and 212 to apply a braking force.

The eighth control valve 238 controls an oil flow of the seventh hydraulic flow path 217 to enable a selection of the above described two operations. That is, when the eighth control valve 238 opens the seventh hydraulic flow path 217, the oil in the first and second hydraulic circuits 201 and 202 may be returned to the second pressure chamber 113 to release a braking force. On the other hand, when the eighth control valve 238 blocks the seventh hydraulic flow path 217, the oil in the first pressure chamber 112 may be delivered to the first and second hydraulic circuits 201 and 202 to apply a braking force.

Further, the eighth control valve 238 may be configured with a solenoid valve capable of controlling a bidirectional flow, and with a normally closed type solenoid valve that is usually closed and is open when an opening signal is received from the ECU.

Also, the hydraulic circuit 200 of the electric brake system 1 according to one embodiment of the present disclosure may include a balance valve 250 that is installed to adjust opening and blocking of an eighth hydraulic flow path 218 communicating the first pressure chamber 112 with the second pressure chamber 113. As one example, the balance valve 250 may be installed at the eighth hydraulic flow path 218 communicating the first hydraulic flow path 211 with the seventh hydraulic flow path 217, one side of the balance valve 250 may be connected to an upstream side of the first control valve 231, and the other side thereof may be connected to a downstream side of the eighth control valve 238. However, the eighth hydraulic flow path 218 may be connected to communicate one of flow paths communicating with the first pressure chamber 112 with one of flow paths communicating with the second pressure chamber 113.

Further, the balance valve 250 may be configured with a normally closed type solenoid valve that is usually closed and is open when an opening signal is received from the ECU.

The balance valve 250 may perform a balancing process to balance in pressure between the first and second pressure chambers 112 and 113 of the hydraulic pressure supply unit 110. Generally, a balance in pressure between the first pressure chamber 112 and the second pressure chamber 113 is maintained. As one example, under a braking situation in which the hydraulic piston 114 is moved forward to apply a braking force, only hydraulic pressure of the first pressure chamber 112 of the two pressure chambers is delivered to the wheel cylinders 40. However, even in such a situation, because the oil in the reservoir 30 is delivered to the second pressure chamber 113 through the second dump flow path 117, a balance in pressure between the two pressure chambers is still maintained. On the other hand, under a braking situation in which the hydraulic piston 114 is moved backward to apply a braking force, only hydraulic pressure of the second pressure chamber 113 of the two pressure chambers is delivered to the wheel cylinders 40. However, even in such a situation, because the oil in the reservoir 30 is delivered to the first pressure chamber 112 through the first dump flow path 116, a balance in pressure between the two pressure chambers is still maintained.

However, when a leak occurs due to a repetitive operation of the hydraulic pressure supply device 100 or an ABS operation is abruptly performed, an imbalance in pressure between the first pressure chamber 112 and the second pressure chamber 113 may be caused. That is, the hydraulic piston 114 may not be located at a calculated position to cause an incorrect operation.

In such a situation, the balance valve 250 is switched to an opened state to connect the first hydraulic flow path 211 to the third hydraulic flow path 213 such that the first pressure chamber 112 and the second pressure chamber 113 communicate with each other. Therefore, a balance in pressure between the first pressure chamber 112 and the second pressure chamber 113 is caused. At this point, to promote the balancing process, the motor 120 may operate to move the hydraulic piston 114 forward or backward.

Also, the electric brake system 1 according to one embodiment of the present disclosure may further include a first dump valve 241 and a second dump valve 242 which are provided at the first and second dump flow paths 116 and 117, respectively, and control an oil flow. The dump valves 241 and 242 may be a check valve that opens in a direction from the reservoir 30 to the first and second pressure chambers 112 and 113, and blocks in a reverse direction. That is, the first dump valve 241 may be a check valve that allows oil to flow from the reservoir 30 to the first pressure chamber 112, and blocks the oil from flowing from the first pressure chamber 112 to the reservoir 30, and the second dump valve 242 may be a check valve that allow oil to flow from the reservoir 30 to the second pressure chamber 113, and blocks the oil from flowing from the second pressure chamber 113 to the reservoir 30.

Also, the second dump flow path 117 may include a bypass flow path, and a third dump valve 243 may be installed at the bypass flow path to control an oil flow between the second pressure chamber 113 and the reservoir 30.

The third dump valve 243 may be configured with a solenoid valve capable of controlling a bidirectional flow, and with a normally open type solenoid valve that is usually open and is closed when a closing signal is received from the ECU.

The hydraulic pressure supply unit 110 of the electric brake system 1 according to one embodiment of the present disclosure may operate in double action. In other words, hydraulic pressure, which is generated in the first pressure chamber 112 while the hydraulic piston 114 is moved forward, may be delivered to the first hydraulic circuit 201 through the first hydraulic flow path 211 to activate the wheel cylinders 40 installed at the front right wheel FR and the rear left wheel RL, and to the second hydraulic circuit 202 through the second hydraulic flow path 212 to activate the wheel cylinders 40 installed at the rear right wheel RR and the front left wheel FL.

Similarly, hydraulic pressure, which is generated in the second pressure chamber 113 while the hydraulic piston 114 is moved backward, may be delivered to the first hydraulic circuit 201 through the third hydraulic flow path 213 and the fourth hydraulic flow path 214 to activate the wheel cylinders 40 installed at the front right wheel FR and the rear left wheel RL, and to the second hydraulic circuit 202 through the third hydraulic flow path 213 and the fifth hydraulic flow path 215 to activate the wheel cylinders 40 installed at the rear right wheel RR and the front left wheel FL.

Also, negative pressure, which is generated in the first pressure chamber 112 while the hydraulic piston 114 is moved backward, may cause the oil of the wheel cylinders 40 installed at the front right wheel FR and the rear left wheel RL to be suctioned and delivered to the first pressure chamber 112 through the first hydraulic circuit 201 and the first hydraulic flow path 211, and may cause the oil of the wheel cylinders 40 installed at the rear right wheel RR and the front left wheel FL to be suctioned and delivered to the first pressure chamber 112 through the second hydraulic circuit 202 and the second hydraulic flow path 212.

Meanwhile, the hydraulic pressure supply unit 110 operating with a double action may discriminately use a low compression section and a high compression section. Also, a low decompression section and a high decompression section may be discriminately used. Hereinafter, a compression situation in which the hydraulic pressure is delivered to the wheel cylinders 40 will be described. However, the same principle may be applicable to a decompression situation in which the hydraulic pressure is discharged from the wheel cylinder 40.

While the hydraulic piston 114 is moved forward, the hydraulic pressure is generated in the first pressure chamber 112. Further, the more the hydraulic piston 114 is moved forward in an initial stage, the more an amount of oil delivered from the first pressure chamber 112 to the wheel cylinder 40 to increase braking pressure. However, because an active stroke of the hydraulic piston 114 exists, an increase of braking pressure due to the forward movement of the hydraulic piston 114 is limited.

The hydraulic pressure supply unit 110 according to one embodiment of the present disclosure may continuously increase the braking pressure using the hydraulic piston 114 that is provided to be operable with a double action even after the low compression section. That is, while the hydraulic piston 114 is again moved backward in a state in which the hydraulic piston 114 is maximally moved forward, the hydraulic pressure is generated in the second pressure chamber 113 and then it is additionally provided to the wheel cylinder 40, thereby increasing the braking pressure.

At this point, because negative pressure is generated in the first pressure chamber 112 while the hydraulic piston 114 is moved backward, the hydraulic pressure of the wheel cylinder 40 should be prevented from being discharged due to such a negative pressure. For this purpose, the seventh control valve 237, which is operated to be open when the hydraulic pressure is discharged from the wheel cylinder 40, is maintained in a closed state such that the hydraulic pressure of the wheel cylinder 40 may be prevented from being discharged through the sixth hydraulic flow path 216. Meanwhile, because the first and second control valves 231 and 232 are configured with a check valve that allows only an oil flow in a direction from the first pressure chamber 112 to the hydraulic circuits 201 and 202, discharging of the hydraulic pressure of the wheel cylinder 40 through the first and second hydraulic flow paths 211 and 212 is not allowed.

Meanwhile, an increase rate of pressure in a section in which the hydraulic piston 114 is moved forward to generate the hydraulic pressure in the first pressure chamber 112 may be different from that in a section in which the hydraulic piston 114 is moved backward to generate the hydraulic pressure in the second pressure chamber 113. The reason for that is that a cross section of the hydraulic piston 114 in the second pressure chamber 113 is less than that of the hydraulic piston 114 in the first pressure chamber 112 by a cross section of the drive shaft 133.

As a cross section of the hydraulic piston 114 is small, an increase and decrease rate of volume according to a stroke of the hydraulic piston 114 is reduced. Therefore, a volume per stroke distance of the oil, which is pushed while the hydraulic piston 114 is moved backward, in the second pressure chamber 113 is less than that of the oil, which is pushed while the hydraulic piston 114 is moved forward, in the first pressure chamber 112.

Next, the motor 120 and the power conversion unit 130 of the hydraulic pressure supply device 100 will be described.

The motor 120 is a device for generating a rotational force according to a signal output from the ECU (not shown) and may generate the rotational force in a forward or backward direction. An angular velocity and a rotational angle of the motor 120 may be precisely controlled. Because such a motor 120 is generally known in the art, a detailed description thereof will be omitted.

Meanwhile, the ECU controls not only the motor 120 but also valves 54, 60, 221a, 221b, 221c, 221d, 222a, 222b, 222c, 222d, 237, 243, and 250 provided at the electric brake system 1 of the present disclosure, which will be described below. An operation of controlling a plurality of valves according to a displacement of the brake pedal 10 will be described below.

A driving force of the motor 120 generates a displacement of the hydraulic piston 114 through the power conversion unit 130, and hydraulic pressure, which is generated while the hydraulic piston 114 slides inside the pressure chamber, is delivered to the wheel cylinder 40 installed at each of the wheels RR, RL, FR, and FL through the first and second hydraulic flow paths 211 and 212.

The power conversion unit 130 is a device for converting a rotational force into a rectilinear movement, and, as one example, may be configured with a worm shaft 131, a worm wheel 132, and the drive shaft 133.

The worm shaft 131 may be integrally formed with a rotational shaft of the motor 120, and rotates the worm wheel 132 engaged therewith and coupled thereto through a worm that is formed on an outer circumferential surface of the worm shaft 131. The worm wheel 132 linearly moves the drive shaft 133 engaged therewith and coupled thereto, and the drive shaft 133 is connected to the hydraulic piston 114 to slide the hydraulic piston 114 inside the cylinder block 111.

To describe such operations again, a signal, which is sensed by the pedal displacement sensor 11 when a displacement occurs at the brake pedal 10, is transmitted to the ECU (not shown), and then the ECU drives the motor 120 in one direction to rotate the worm shaft 131 in the one direction. A rotational force of the worm shaft 131 is transmitted to the drive shaft 133 via the worm wheel 132, and then the hydraulic piston 114 connected to the drive shaft 133 is moved forward to generate hydraulic pressure in the first pressure chamber 112.

On the other hand, when the pedal effort is released from the brake pedal 10, the ECU drives the motor 120 in a reverse direction, and thus the worm shaft 131 is reversely rotated. Consequently, the worm wheel 132 is also reversely rotated, and thus negative pressure is generated in the first pressure chamber 112 while the hydraulic piston 114 connected to the drive shaft 133 is returned to its original position, that is, moved backward.

Meanwhile, it is possible for the generation of hydraulic pressure and negative pressure to be opposite to that which is described above. That is, the signal, which is sensed by the pedal displacement sensor 11 when the displacement occurs at the brake pedal 10, is transmitted to the ECU (not shown), and then the ECU drives the motor 120 in the reverse direction to reversely rotate the worm shaft 131. The rotational force of the worm shaft 131 is transmitted to the drive shaft 133 via the worm wheel 132, and then the hydraulic piston 114 connected to the drive shaft 133 is moved backward to generate hydraulic pressure in the second pressure chamber 113.

On the other hand, when the pedal effort is released from the brake pedal 10, the ECU drives the motor 120 in the one direction, and thus the worm shaft 131 is rotated in the one direction. Consequently, the worm wheel 132 is also reversely rotated, and thus negative pressure is generated in the second pressure chamber 113 while the hydraulic piston 114 connected to the drive shaft 133 is returned to its original position, that is, is moved forward.

As described above, the hydraulic pressure supply device 100 serves to deliver the hydraulic pressure to the wheel cylinders 40 or to cause the hydraulic pressure to be discharged therefrom and delivered to the reservoir 30 according to a rotational direction of the rotational force generated from the motor 120.

Meanwhile, when the motor 120 is rotated in the one direction, the hydraulic pressure may be generated in the first pressure chamber 112 or the negative pressure may be generated in the second pressure chamber 113, and whether the hydraulic pressure is used for braking or the negative pressure is used for releasing braking may be determined through the control of the valves 54, 60, 221*a*, 221*b*, 221*c*, 221*d*, 222*a*, 222*b*, 222*c*, 222*d*, 237, 243, and 250. This will be described in detail below.

Although not shown in the drawing, the power conversion unit 130 may be configured with a ball screw nut assembly. For example, the power conversion unit 130 may be configured with a screw which is integrally formed with the rotational shaft of the motor 120 or is connected to and rotated with the rotational shaft thereof, and a ball nut which is screw-coupled to the screw in a state in which a rotation of the ball nut is restricted to perform a rectilinear movement according to a rotation of the screw. The hydraulic piston 114 is connected to the ball nut of the power conversion unit 130 to pressurize the pressure chamber by means of the rectilinear movement of the ball nut. Such a ball screw nut assembly is a device for converting a rotational movement into a rectilinear movement, and a structure thereof is generally known in the art so that a detailed description thereof will be omitted.

Further, it should be understood that the power conversion unit 130 according to one embodiment of the present disclosure may employ any structure capable of converting a rotational movement into a rectilinear movement in addition to the structure of the ball screw nut assembly.

Also, the electric brake system 1 according to one embodiment of the present disclosure may further include the first and second backup flow paths 251 and 252 capable of directly supplying oil discharged from the master cylinder 20 to the wheel cylinders 40 when the hydraulic pressure supply device 100 operates abnormally.

The first cut valve 261 for controlling an oil flow may be provided at the first backup flow path 251, and the second cut valve 262 for controlling an oil flow may be provided at the second backup flow path 252. Also, the first backup flow path 251 may connect the first hydraulic port 24*a* to the first hydraulic circuit 201, and the second backup flow path 252 may connect the second hydraulic port 24*b* to the second hydraulic circuit 202.

Further, the first and second cut valves 261 and 262 may be configured with a normally opened type solenoid valve that is usually open and is closed when a closing signal is received from the ECU.

Next, the hydraulic control unit 200 according to one embodiment of the present disclosure will be described with reference to FIG. 1.

The hydraulic control unit 200 may be configured with the first hydraulic circuit 201 and the second hydraulic circuit 202, each of which receives hydraulic pressure to control two wheels. As one example, the first hydraulic circuit 201 may control the front right wheel FR and the rear left wheel RL, and the second hydraulic circuit 202 may control the front left wheel FL and the rear right wheel RR. Further, the wheel cylinder 40 is installed at each of the wheels FR, FL, RR, and RL to perform braking by receiving the hydraulic pressure.

The first hydraulic circuit 201 is connected to the first hydraulic flow path 211 to receive the hydraulic pressure provided from the hydraulic pressure supply device 100, and the first hydraulic flow path 211 branches into two flow paths that are connected to the front right wheel FR and the rear left wheel RL, respectively. Similarly, the second hydraulic circuit 202 is connected to the second hydraulic flow path 212 to receive the hydraulic pressure provided from the hydraulic pressure supply device 100, and the second hydraulic flow path 212 branches into two flow paths that are connected to the front left wheel FL and the rear right wheel RR, respectively.

The hydraulic circuits 201 and 202 may be provided with a plurality of inlet valves 221 (that is, 221*a*, 221*b*, 221*c*, and 221*d*) to control a hydraulic pressure flow. As one example, two inlet valves 221*a* and 221*b* may be provided at the first hydraulic circuit 201 and connected to the first hydraulic flow path 211 to independently control the hydraulic pressure delivered to two of the wheel cylinders 40. Also, two inlet valves 221*c* and 221*d* may be provided at the second hydraulic circuit 202 and connected to the second hydraulic flow path 212 to independently control the hydraulic pressure delivered to two of the wheel cylinders 40.

Further, the plurality of inlet valves 221 may be disposed at an upstream side of each of the wheel cylinders 40 and may be configured with a normally opened type solenoid valve that is usually open and is closed when a closing signal is received from the ECU.

Also, the hydraulic control unit 200 may be further provided with a plurality of outlet valves 222 (that is, 222*a*, 222*b*, 222*c*, and 222*d*) connected to the reservoirs 30 to improve braking release performance when the braking is released. Each of the outlet valves 222 is connected to the wheel cylinder 40 to control discharging of the hydraulic pressure from each of the wheels RR, RL, FR, and FL. That is, when braking pressure of each of the wheels RR, RL, FR, and FL is sensed and a decompression of the braking is determined to be required, the outlet valves 222 may be selectively opened to control the braking pressure.

Further, the outlet valves 222 may be configured with a normally closed type solenoid valve that is usually closed and is open when an opening signal is received from the ECU.

In addition, the hydraulic control unit 200 may be connected to the backup flow paths 251 and 252. As one example, the first hydraulic circuit 201 may be connected to the first backup flow path 251 to receive the hydraulic pressure provided from the master cylinder 20, and the second hydraulic circuit 202 may be connected to the second backup flow path 252 to receive the hydraulic pressure provided from the master cylinder 20.

At this point, the first backup flow path 251 may be connected to the first hydraulic circuit 201 at an upstream side of each of the first and second inlet valves 221*a* and 221*b*. Similarly, the second backup flow path 252 may be connected to the second hydraulic circuit 202 at an upstream side of each of the third and fourth inlet valves 221*c* and 221*d*. Consequently, when the first and second cut valves 261 and 262 are closed, the hydraulic pressure provided from the hydraulic pressure supply device 100 may be supplied to the wheel cylinders 40 through the first and second hydraulic circuits 201 and 202. Also, when the first and second cut valves 261 and 262 are opened, the hydraulic pressure provided from the master cylinder 20 may be supplied to the wheel cylinders 40 through the first and second backup flow paths 251 and 252. At this point, because the plurality of inlet valves 221*a*, 221*b*, 221*c*, and 221*d* are in an opened state, there is no need to switch an operation state of each of them.

Meanwhile, an undescribed reference number "PS1" is a hydraulic flow path pressure sensor which senses hydraulic pressure of each of the first and second hydraulic circuits 201 and 202, and an undescribed reference number "PS2" is a backup flow path pressure sensor which senses oil pressure of the master cylinder 20. Further, an undescribed reference number "MPS" is a motor control sensor which controls a rotational angle or a current of the motor 120.

Hereinafter, an operation of the electric brake system 1 according to one embodiment of the present disclosure will be described in detail.

FIGS. 3 and 4 show a state in which the electric brake system 1 according to one embodiment of the present disclosure performs a braking operation normally, FIG. 3 is a hydraulic circuit diagram illustrating a situation in which braking pressure is provided while the hydraulic piston 114 is moved forward, and FIG. 4 is a hydraulic circuit diagram illustrating a situation in which braking pressure is provided while the hydraulic piston 114 is moved backward.

When a driver begins braking, an amount of braking requested by the driver may be sensed through the pedal displacement sensor 11 on the basis of information including pressure on the brake pedal 10 put by the driver, and the like. The ECU (not shown) receives an electrical signal output from the pedal displacement sensor 11 to drive the motor 120.

Also, the ECU may receive an amount of regenerative braking through the backup flow path pressure sensor PS2 provided at an outlet side of the master cylinder 20 and the hydraulic flow path pressure sensor PS1 provided at the second hydraulic circuit 202, and may calculate an amount of braking friction based on a difference between the amount of braking requested by the driver and the amount of regenerative braking, thereby determining the magnitude of an increase or reduction of pressure at the wheel cylinder 40.

Referring to FIG. 3, when the driver steps on the brake pedal 10 at an initial stage of braking, the motor 120 is operated to rotate in one direction, and a rotational force of the motor 120 is delivered to the hydraulic pressure supply unit 110 by means of the power conversion unit 130, and thus the hydraulic pressure is generated in the first pressure chamber 112 while the hydraulic piston 114 of the hydraulic pressure supply unit 110 is moved forward. The hydraulic pressure discharged from the hydraulic pressure supply unit 110 is delivered to the wheel cylinder 40 provided at each of the four wheels through the first hydraulic circuit 201 and the second hydraulic circuit 202 to generate a braking force.

In particular, the hydraulic pressure provided from the first pressure chamber 112 is directly delivered to the wheel cylinders 40 provided at the two wheels FR and RL through the first hydraulic flow path 211 connected to the first communicating hole 111a. At this point, the first and second inlet valves 221a and 221b, which are respectively installed at two flow paths branching from the first hydraulic flow path 211, are provided in an opened state. Also, the first and second outlet valves 222a and 222b, which are respectively installed at flow paths which respectively branch from the two flow paths branching from the first hydraulic flow path 211, are maintained in a closed state to prevent the hydraulic pressure from leaking into the reservoirs 30.

Further, the hydraulic pressure provided from the first pressure chamber 112 is directly delivered to the wheel cylinders 40 provided at the two wheels RR and FL through the second hydraulic flow path 212 connected to the second communicating hole 111b. At this point, the third and fourth inlet valves 221c and 221d, which are respectively installed at two flow paths branching from the second hydraulic flow path 212, are provided in an opened state. Also, the third and fourth outlet valves 222c and 222d, which are respectively installed at flow paths which respectively branch from the two flow paths branching from the second hydraulic flow path 212, are maintained in a closed state to prevent the hydraulic pressure from leaking into the reservoirs 30.

Also, when the pressure delivered to the wheel cylinders 40 is measured as being higher than a target pressure value according to the pedal effort of the brake pedal 10, one or more among the first to fourth outlet valves 222 may be opened to control the pressure to converge on the target pressure value.

Further, when the hydraulic pressure is generated in the hydraulic pressure supply device 100, the first and second cut valves 261 and 262 installed at the first and second backup flow paths 251 and 252, which are connected to the first and second hydraulic ports 24a and 24b of the master cylinder 20, are closed, and thus the hydraulic pressure discharged from the master cylinder 20 is not delivered to the wheel cylinders 40.

In addition, the pressure generated by means of a pressurization of the master cylinder 20 according to the pedal effort of the brake pedal 10 is delivered to the simulation device 50 connected to the master cylinder 20. At this point, the normally closed type simulator valve 54 arranged at the rear end of the simulation chamber 51 is opened so that the oil filled in the simulation chamber 51 is delivered to the reservoir 30 through the simulator valve 54. Also, the reaction force piston 52 is moved, and pressure corresponding to a reaction force of the reaction force spring 53 supporting the reaction force piston 52 is generated inside the simulation chamber 51 to provide an appropriate pedal feeling to the driver.

Moreover, the hydraulic flow path pressure sensor PS1 installed at the second hydraulic flow path 212 may detect a flow rate delivered to the wheel cylinder 40 installed at the front left wheel FL or the rear right wheel RR (hereinafter, simply referred to as the wheel cylinder 40). Therefore, the hydraulic pressure supply device 100 may be controlled according to an output of the hydraulic flow path pressure sensor PS1 to control a flow rate delivered to the wheel cylinder 40. In particular, a distance and a speed of the forward movement of the hydraulic piston 114 may be adjusted so that a flow rate discharged from the wheel cylinder 40 and a discharge speed thereof may be controlled.

Unlike FIG. 3, even when the hydraulic piston 114 is moved in a reverse direction, that is, moved backward, a braking force may be generated at the wheel cylinder 40.

Referring to FIG. 4, when the driver steps on the brake pedal 10 at an initial stage of braking, the motor 120 is operated to rotate in the reverse direction, and a rotational force of the motor 120 is delivered to the hydraulic pressure supply unit 110 by means of the power conversion unit 130, and thus the hydraulic pressure is generated in the second pressure chamber 113 while the hydraulic piston 114 of the hydraulic pressure supply unit 110 is moved backward. The hydraulic pressure discharged from the hydraulic pressure supply unit 110 is delivered to the wheel cylinder 40 provided at each of the four wheels through the first hydraulic circuit 201 and the second hydraulic circuit 202 to generate a braking force.

In particular, the hydraulic pressure provided from the second pressure chamber 113 is directly delivered to the wheel cylinders 40 provided at the two wheels FR and RL through the third hydraulic flow path 213 and the fourth hydraulic flow path 214 which are connected to the third communicating hole 111c, and to the wheel cylinders 40 provided at the two wheels RR and FL through the third hydraulic flow path 213 and the fifth hydraulic flow path 215.

Next, a case of releasing the braking force in the braking state established when the electric brake system 1 according to one embodiment of the present disclosure operates normally will be described.

FIGS. 5 and 6 show a state in which the braking force is released when the electric brake system 1 according to one embodiment of the present disclosure operates normally, FIG. 5 is a hydraulic circuit diagram illustrating a situation in which braking pressure is released while the hydraulic piston 114 is moved backward, and FIG. 6 is a hydraulic circuit diagram illustrating a situation in which braking pressure is released while the hydraulic piston 114 is moved forward.

Referring to FIG. 5, when a pedal effort applied to the brake pedal 10 is released, the motor 120 generates a rotational force in a reverse direction compared to that of when the braking operation is performed to deliver the generated rotational force to the power conversion unit 130, and the worm shaft 131 of the power conversion unit 130, the worm wheel 132 thereof, and the drive shaft 133 thereof are rotated in a reverse direction compared to that of when the braking operation is performed to move backward and return the hydraulic piston 114 to its original position, thereby releasing the pressure of the first pressure chamber 112 or generating negative pressure therein. Further, the hydraulic pressure supply unit 110 receives the hydraulic pressure discharged from the wheel cylinders 40 through the first and second hydraulic circuits 201 and 202 to deliver the received hydraulic pressure to the first pressure chamber 112.

In particular, the negative pressure generated in the first pressure chamber 112 releases the pressure of the wheel cylinders 40 provided at the two wheels FR and RL through the first hydraulic flow path 211 connected to the first communicating hole 111*a*. At this point, the first and second inlet valves 221*a* and 221*b*, which are respectively installed at the two flow paths branching from the first hydraulic flow path 211, are provided in the opened state. Also, the first and the second outlet valves 222*a* and 222*b*, which are respectively installed at flow paths that respectively branch from the two flow paths branching from the first hydraulic flow path 211, are maintained in the closed state to prevent the oil of the reservoirs 30 from flowing into the first hydraulic flow path 211.

Further, the negative pressure generated in the first pressure chamber 112 releases the pressure of the wheel cylinders 40 provided at the two wheels FL and RR through the second hydraulic flow path 212 connected to the first communicating hole 111*a*. At this point, the third and fourth inlet valves 221*c* and 221*d*, which are respectively installed at the two flow paths branching from the second hydraulic flow path 212, are provided in an opened state. Also, the third and fourth outlet valves 222*c* and 222*d*, which are respectively installed at flow paths that respectively branch from the two flow paths branching from the second hydraulic flow path 212, are maintained in the closed state to prevent the oil of the reservoirs 30 from flowing into the second hydraulic flow path 212.

Also, when the negative pressure delivered to the first and second hydraulic circuits 201 and 202 is measured as being higher than a target pressure releasing value according to an amount of release of the brake pedal 10, one or more among the first to fourth outlet valves 222 may be opened to control the negative pressure to converge on the target pressure releasing value.

In addition, when the hydraulic pressure is generated in the hydraulic pressure supply device 100, the first and second cut valves 261 and 262 installed at the first and second backup flow paths 251 and 252, which are connected to the first and second hydraulic ports 24*a* and 24*b* of the master cylinder 20, are closed so that the negative pressure generated in the master cylinder 20 is not delivered to the wheel cylinders 40.

Referring to FIG. 6, when a pedal effort applied to the brake pedal 10 is released, the motor 120 generates a rotational force in a reverse direction compared to that of when performing the braking operation to deliver the generated rotational force to the power conversion unit 130, and the worm shaft 131 of the power conversion unit 130, the worm wheel 132 thereof, and the drive shaft 133 thereof are rotated in a reverse direction compared to that of when performing the braking operation to move forward and return the hydraulic piston 114 to its original position, thereby releasing the pressure of the second pressure chamber 113 or generating negative pressure therein. Further, the hydraulic pressure supply unit 110 receives the hydraulic pressure discharged from the wheel cylinders 40 through the first and second hydraulic circuits 201 and 202 to deliver the received hydraulic pressure to the second pressure chamber 113.

In particular, the negative pressure generated in the second pressure chamber 113 releases the pressure of the wheel cylinders 40 provided at the four wheels FR, RL, RR, and FL through the third hydraulic flow path 213, the sixth hydraulic flow path 216, and the seventh hydraulic flow path 217 which are connected to the third communicating hole 111*c*. At this point, the first to fourth inlet valves 221*a*, 221*b*, 221*c*, and 221*d* are provided in the opened state. Also, the first to fourth outlet valves 222*a*, 222*b*, 222*c*, and 222*d* are maintained in the closed state to prevent the oil of the reservoirs 30 from flowing into the wheel cylinders 40.

To describe in more detail, the oil of the wheel cylinders 40 provided at the two wheels FR and RL connected to the first hydraulic circuit 201 passes the fifth control valve 235 to move to the sixth hydraulic flow path 216 and the seventh hydraulic flow path 217, and passes the eighth control valve 238 provided at the seventh hydraulic flow path 217 to flow into the second pressure chamber 113 through the third hydraulic flow path 213.

Further, the oil of the wheel cylinders 40 provided at the two wheels RR and FL connected to the second hydraulic circuit 202 passes the sixth control valve 236 to move to the sixth hydraulic flow path 216 and the seventh hydraulic flow path 217, and passes the eighth control valve 238 provided at the seventh hydraulic flow path 217 to flow into the second pressure chamber 113 through the third hydraulic flow path 213.

Moreover, the hydraulic flow path pressure sensor PS1 installed at the second hydraulic flow path 212 may detect a flow rate discharged from the wheel cylinder 40 installed at the front left wheel FL or the rear right wheel RR. Therefore, the hydraulic pressure supply device 100 may be controlled according to an output of the hydraulic flow path pressure sensor PS1 so that a flow rate discharged from the wheel cylinder 40 may be controlled. In particular, a distance and a speed of the forward movement of the hydraulic piston 114 may be adjusted so that a flow rate discharged from the wheel cylinder 40 and a discharge speed thereof may be controlled.

FIGS. 7 and 8 show a state in which an anti-lock brake system (ABS) is operated through the electric brake system 1 according to one embodiment of the present disclosure, FIG. 7 is a hydraulic circuit diagram illustrating a situation in which the hydraulic piston 114 is moved forward and selective braking is performed, and FIG. 8 is a hydraulic circuit diagram illustrating a situation in which the hydraulic piston 114 is moved backward and selective braking is performed.

When the motor 120 is operated according to a pedal effort of the brake pedal 10, a rotational force of the motor 120 is transmitted to the hydraulic pressure supply unit 110 through the power conversion unit 130, thereby generating hydraulic pressure. At this point, the first and second cut valves 261 and 262 are closed and thus the hydraulic pressure discharged from the master cylinder 20 is not delivered to the wheel cylinders 40.

Referring to FIG. 7, because hydraulic pressure is generated in the first pressure chamber 112 while the hydraulic piston 114 is moved forward and the fourth inlet valve 221d is provided in the opened state, the hydraulic pressure delivered through the second hydraulic flow path 212 operates the wheel cylinder 40 located at the front left wheel FL to generate a braking force.

At this point, the first to third inlet valves 221a, 221b, and 221c are switched to a closed state and the first to fourth outlet valves 222a, 222b, 222c, and 222d are maintained in the closed state. Further, the third dump valve 243 is provided in the opened state so that the second pressure chamber 113 is filled with oil from the reservoir 30.

Referring to FIG. 8, because hydraulic pressure is generated in the second pressure chamber 113 while the hydraulic piston 114 is moved backward and the first inlet valve 221a is provided in the opened state, the hydraulic pressure delivered through the first hydraulic flow path 211 operates the wheel cylinder 40 located at the front right wheel FR to generate a braking force.

At this point, the second to fourth inlet valves 221b, 221c, and 221d are switched to the closed state, and the first to fourth outlet valves 222a, 222b, 222c, and 222d are maintained in the closed state.

That is, the electric brake system 1 according to one embodiment of the present disclosure may independently control operations of the motor 120 and each of the valves 54, 60, 221a, 221b, 221c, 221d, 222a, 222b, 222c, 222d, 237, 243, and 250 to selectively deliver or discharge the hydraulic pressure to or from the wheel cylinder 40 of each of the wheels RL, RR, FL, and FR according to a required pressure such that a precise control of the hydraulic pressure may be possible.

Next, a case in which such an electric brake system 1 operates abnormally will be described. FIG. 9 is a hydraulic circuit diagram illustrating a situation in which the electric brake system 1 according to one embodiment of the present disclosure operates abnormally.

Referring to FIG. 9, when the electric brake system 1 operates abnormally, each of the valves 54, 60, 221a, 221b, 221c, 221d, 222a, 222b, 222c, 222d, 237, 243, and 250 is provided in an initial state of braking, that is, a non-operating state.

When a driver pressurizes the brake pedal 10, the input rod 12 connected to the brake pedal 10 is moved forward, and the first piston 21a, which is in contact with the input rod 12, is moved forward and at the same time the second piston 22a is moved forward by means of the pressurization or movement of the first piston 21a. At this point, because no gap exists between the input rod 12 and the first piston 21a, the braking may be rapidly performed.

Further, the hydraulic pressure discharged from the master cylinder 20 is delivered to the wheel cylinders 40 through the first and second backup flow paths 251 and 252 that are connected for the purpose of backup braking to realize a braking force.

At this point, the first and second cut valves 261 and 262 respectively installed at the first and second backup flow paths 251 and 252, the inlet valves 221 opening and closing the flow paths of the first hydraulic circuit 201 and the second hydraulic circuit 202 are configured with a normally opened type solenoid valve, and the simulator valve 54 and the outlet valves 222 are configured with a normally closed type solenoid valve so that the hydraulic pressure is directly delivered to the four wheel cylinders 40. Therefore, braking is stably realized to improve braking safety.

FIG. 10 is a hydraulic circuit diagram illustrating a state in which the electric brake system 1 according to one embodiment of the present disclosure operates in a dump mode.

The electric brake system 1 according to one embodiment of the present disclosure may discharge only braking pressure provided to corresponding wheel cylinders 40 through the first to fourth outlet valves 222a, 222b, 222c, and 222d.

Referring to FIG. 10, when the first to fourth inlet valves 221a, 221b, 221c, and 221d are switched to the closed state, the first to third outlet valves 222a, 222b, and 222c are maintained in the closed state, and the fourth outlet valve 222d is switched to the opened state, the hydraulic pressure discharged from the wheel cylinder 40 installed at the front left wheel FL is discharged to the reservoir 30 through the fourth outlet valve 222d.

The reason for that the hydraulic pressure in the wheel cylinders 40 is discharged through the outlet valves 222 is that pressure in the reservoir 30 is less than that in the wheel cylinder 40. Generally, the pressure in the reservoir 30 is provided as atmospheric pressure. Because the pressure in the wheel cylinder 40 is generally and considerably higher than atmospheric pressure, the hydraulic pressure of the wheel cylinders 40 may be rapidly discharged to the reservoirs 30 when the outlet valves 222 are opened.

Meanwhile, although not shown in the drawing, the fourth outlet valve 222d is opened to discharge the hydraulic pressure of the corresponding wheel cylinder 40 and at the same time the first to third inlet valves 221a, 221b, and 221c are maintained in the opened state so that the hydraulic pressure may be supplied to the three remaining wheels FR, RL, and RR.

Further, a flow rate discharged from the wheel cylinder 40 is increased when a difference in pressure between the wheel cylinder 40 and the first pressure chamber 112 is large. As one example, as a volume of the first pressure chamber 112 is increased while the hydraulic piston 114 is moved backward, a larger amount of flow rate may be discharged from the wheel cylinder 40.

As described above, each of the valves 221a, 221b, 221c, 221d, 222a, 222b, 222c, 222d, 237, 243, and 250 of the hydraulic control unit 200 may be independently controlled to selectively deliver or discharge the hydraulic pressure to or from the wheel cylinder 40 of each of the wheels RL, RR, FL, and FR according to a required pressure such that a precise control of the hydraulic pressure may be possible.

FIG. 11 is a hydraulic circuit diagram illustrating a state in which the electric brake system 1 according to one embodiment of the present disclosure operates in a balance mode.

The balance mode is performed when an imbalance in pressure between the first pressure chamber 112 and the second pressure chamber 113 occurs. As one example, the ECU may sense an imbalance state in pressure by detecting the hydraulic pressure of the first hydraulic circuit 201 and the hydraulic pressure of the second hydraulic circuit 202 from the hydraulic flow path pressure sensor PS1.

In the balance mode, the balance valve 250 is switched to an opened state. Only with a communication of the first hydraulic flow path 211 and the third hydraulic flow path 213 through the opening of the balance valve 250, a balance in pressure between the first pressure chamber 112 and the second pressure chamber 113 may be accomplished. To promote a balancing process, however, the hydraulic pressure supply device 100 may operate.

Hereinafter, an example when pressure in the first pressure chamber 112 is greater than that in the second pressure chamber 113 will be described.

When the motor 120 is operated, the hydraulic piston 114 is moved forward, the hydraulic pressure in the first pressure chamber 112 is delivered from the first hydraulic flow path 211 to the third hydraulic flow path 213 through the balance valve 250 being in the opened state, and, during such a process, a balance in pressure between the first pressure chamber 112 and the second pressure chamber 113 is accomplished.

When the pressure in the second pressure chamber 113 is greater than that in the first pressure chamber 112, the hydraulic pressure in the second pressure chamber 113 is delivered to the first pressure chamber 112 to balance pressure.

FIG. 12 is a hydraulic circuit diagram illustrating a state in which the electric brake system 1 according to one embodiment of the present disclosure operates in an inspection mode.

As shown in FIG. 12, when the electric brake system 1 operates abnormally, the valves 54, 60, 221a, 221b, 221c, 221d, 222a, 222b, 222c, 222d, 237, 243, and 250 are provided in an initial state of braking, that is, a non-operating state, and the first and second cut valves 261 and 262 respectively installed at the first and second backup flow paths 251 and 252 and each of the inlet valves 221 provided at the upstream of the wheel cylinder 40 that is provided at each of the wheels RR, RL, FR, and FL are opened so that the hydraulic pressure is directly delivered to the wheel cylinders 40.

At this point, the simulator valve 54 is provided in the closed state so that the hydraulic pressure delivered to the wheel cylinders 40 through the first backup flow path 251 is prevented from leaking into the reservoir 30 through the simulation device 50. Therefore, the driver steps on the brake pedal 10 so that the hydraulic pressure discharged from the master cylinder 20 is delivered to the wheel cylinders 40 without a loss to ensure stable braking.

However, when a leak occurs at the simulator valve 54, a portion of the hydraulic pressure discharged from the master cylinder 20 may be lost to the reservoir 30 through the simulator valve 54. The simulator valve 54 is provided to be closed in an abnormal mode, and the hydraulic pressure discharged from the master cylinder 20 pushes the reaction force piston 52 of the simulation device 50 so that a leak may occur at the simulator valve 54 by means of pressure formed at the rear end of the simulation chamber 51.

As such, when the leak occurs at the simulator valve 54, a braking force may not be obtained as intended by the driver. Consequently, there is a problem in safety of braking.

The inspection mode is a mode that inspects whether a loss of pressure exists by generating hydraulic pressure at the hydraulic pressure supply device 100 to inspect whether a leak occurs at the simulator valve 54. When the hydraulic pressure discharged from the hydraulic pressure supply device 100 is delivered to the reservoir 30 to cause a loss of pressure, it is difficult to verify whether a leak occurs at the simulator valve 54.

Therefore, in the inspection mode, an inspection valve 60 may be closed and thus a hydraulic circuit connected to the hydraulic pressure supply device 100 may be configured as a closed circuit. That is, the inspection valve 60, the simulator valve 54, and the outlet valves 222 are closed and thus the flow paths connecting the hydraulic pressure supply device 100 to the reservoirs 30 are closed so that the closed circuit may be configured.

In the inspection mode, the electric brake system 1 according to one embodiment of the present disclosure may provide the hydraulic pressure to only the first backup flow path 251, which is connected to the simulation device 50, of the first and second backup flow paths 251 and 252. Therefore, to prevent the hydraulic pressure discharged from the hydraulic pressure supply device 100 from being delivered to the master cylinder 20 along the second backup flow path 252, the second cut valve 262 may be switched to a closed state and the balance valve 250 may be maintained in the closed state in the inspection mode.

Referring to FIG. 12, in the inspection mode, at an initial state of each of the valves 54, 60, 221a, 221b, 221c, 221d, 222a, 222b, 222c, 222d, 237, 243, and 250 provided at the electric brake system 1 of the present disclosure, the first to fourth inlet valves 221a, 221b, 221c, and 221d and the second cut valve 262 may be switched to the closed state, and the first cut valve 261 is maintained in the opened state so that the hydraulic pressure generated at the hydraulic pressure supply device 100 may be delivered to the master cylinder 20. The inlet valves 221 are closed so that the hydraulic pressure of the hydraulic pressure supply device 100 may be prevented from being delivered to the first and second hydraulic circuits 201 and 202, the second cut valve 262 is switched to the closed state so that the hydraulic pressure of the hydraulic pressure supply device 100 may be prevented from circulating along the first backup flow path 251 and the second backup flow path 252, and the inspection valve 60 is switched to a closed state so that the hydraulic pressure supplied to the master cylinder 20 may be prevented from leaking into the reservoir 30.

In the inspection mode, after generating the hydraulic pressure at the hydraulic pressure supply device 100, the ECU may analyze a signal transmitted from the backup flow path pressure sensor PS2 measuring oil pressure of the master cylinder 20 to sense whether a leak occurs at the simulator valve 54. As one example, when there is no loss on the basis of the measurement result of the backup flow path pressure sensor PS2, the simulator valve 54 may be determined to have no leak, and, when the loss occurs, the simulator valve 54 may be determined to have a leak.

FIG. 13 is a hydraulic circuit diagram illustrating a non-braking state of an electric brake system 2 according to another embodiment of the present disclosure.

Comparing FIG. 1 with FIG. 13, the electric brake system 2 according to another embodiment of the present disclosure shown in FIG. 13 is different from the electric brake system 1 according to one embodiment of the present disclosure shown in FIG. 1 in that the eighth hydraulic flow path 218 is omitted and the eighth control valve 238 serves to perform a function of the balance valve 250.

Referring to FIG. 13, the hydraulic circuit 200 of the electric brake system 2 according to another embodiment of the present disclosure may include a balance valve 250 that is installed to adjust opening and blocking of the seventh hydraulic flow path 217 communicating the first pressure chamber 112 with the second pressure chamber 113. As one example, the balance valve 250 may be installed at the seventh hydraulic flow path 217 communicating the third hydraulic flow path 213 with the sixth hydraulic flow path 216, and one side of the balance valve 250 may be connected to an upstream side of the seventh control valve 237.

Further, the balance valve 250 may be configured with a normally closed type solenoid valve that is usually closed and is open when an opening signal is received from the ECU.

The balance valve 250 controls an oil flow of the seventh hydraulic flow path 217 to enable a selection of two operations. That is, when the balance valve 250 opens the seventh hydraulic flow path 217, the oil of the first and second hydraulic circuits 201 and 202 may be returned to the second pressure chamber 113 to release a braking force. On the other hand, when the balance valve 250 blocks the seventh hydraulic flow path 217, the oil in the first pressure chamber 112 may be delivered to the first and second hydraulic circuits 201 and 202 to apply a braking force.

FIG. 14 is a hydraulic circuit diagram illustrating a state in which the electric brake system 2 according to another embodiment of the present disclosure operates in a balance mode.

The balance mode may be performed when an imbalance in pressure between the first pressure chamber 112 and the second pressure chamber 113 occurs. As one example, the ECU may sense an imbalance state in pressure by detecting the hydraulic pressure of the first hydraulic circuit 201 and the hydraulic pressure of the second hydraulic circuit 202 from the hydraulic flow path pressure sensor PS1.

In the balance mode, the seventh control valve 237 and the balance valve 250 are switched to an opened state. Only with a communication of the sixth hydraulic flow path 216 and the third hydraulic flow path 213 through the opening of the seventh control valve 237 and the balance valve 250, a balance in pressure between the first pressure chamber 112 and the second pressure chamber 113 may be accomplished. To promote a balancing process, however, the hydraulic pressure supply device 100 may operate.

Hereinafter, an example when pressure in the first pressure chamber 112 is greater than that in the second pressure chamber 113 will be described. When the motor 120 is operated, the hydraulic piston 114 is moved forward, the hydraulic pressure in the first pressure chamber 112 is delivered from the sixth hydraulic flow path 216 to the third hydraulic flow path 213 through the seventh control valve 237 and the balance valve 250 which are in the opened state, and, during such a process, a balance in pressure between the first pressure chamber 112 and the second pressure chamber 113 is accomplished.

When the pressure in the second pressure chamber 113 is greater than that in the first pressure chamber 112, the hydraulic pressure in the second pressure chamber 113 is delivered to the first pressure chamber 112 to balance pressure.

As is apparent from the above description, the electric brake system according to the embodiments of the present disclosure is capable of more rapidly providing hydraulic pressure and more precisely controlling an increase of pressure by providing a plurality of pistons of a hydraulic pressure supply device to configure a double action structure.

Also, hydraulic pressure or negative pressure may be provided by dividing a section into a low pressure section and a high pressure section so that a braking force may be adaptively provided or released according to a braking situation.

In addition, using the high pressure section, a braking force may be provided in a pressure greater than a maximum pressure in the low pressure section.

[Description of Reference Numerals]

| | |
|---|---|
| 10: Brake Pedal | 11: Pedal Displacement Sensor |
| 20: Master Cylinder | 30: Reservoir |
| 40: Wheel Cylinder | 50: Simulation Device |
| 54: Simulator Valve | 60: Inspection Valve |
| 100: Hydraulic Pressure Supply Device | 110: Hydraulic Pressure Supply Unit |
| 120: Motor | 130: Power Conversion Unit |
| 200: Hydraulic Control Unit | 201: First Hydraulic Circuit |
| 202: Second Hydraulic Circuit | 211: First Hydraulic Flow Path |
| 212: Second Hydraulic Flow Path | 213: Third Hydraulic Flow Path |
| 214: Fourth Hydraulic Flow Path | 215: Fifth Hydraulic Flow Path |
| 216: Sixth Hydraulic Flow Path | 217: Seventh Hydraulic Flow Path |
| 221: Inlet Valves | 222: Outlet Valves |
| 231: First Control Valve | 232: Second Control Valve |
| 233: Third Control Valve | 234: Fourth Control Valve |
| 235: Fifth Control Valve | 236: Sixth Control Valve |
| 237: Seventh Control Valve | 238: Eighth Control Valve |
| 250: Balance Valve | 241: First Dump Valve |
| 242: Second Dump Valve | 251: First Backup Flow Path |
| 252: Second Backup Flow Path | 261: First Cut Valve |
| 262: Second Cut Valve | |

What is claimed is:

1. An electric brake system comprising:
a hydraulic pressure supply device configured to generate hydraulic pressure using a piston which is operated by means of an electrical signal that is output corresponding to a displacement of a brake pedal, and including a first pressure chamber provided at one side of the piston being movably accommodated inside a cylinder block and connected to one or more wheel cylinders, and a second pressure chamber provided at the other side of the piston and connected to the one or more wheel cylinders;
a first hydraulic flow path configured to communicate with the first pressure chamber and provide hydraulic pressure generated in the first pressure chamber to the one or more wheel cylinders;
a second hydraulic flow path configured to communicate with the first pressure chamber and provide the hydraulic pressure generated in the first pressure chamber to the one or more wheel cylinders;
a third hydraulic flow path configured to communicate with the second pressure chamber, branch at the middle of the third hydraulic flow path to be connected to each of the first hydraulic flow path and the second hydraulic flow path, and provide hydraulic pressure generated in the second pressure chamber to the one or more wheel cylinders;
a sixth hydraulic flow path configured to communicate with the first pressure chamber, branch at the middle of the sixth hydraulic flow path to be connected to each of the first hydraulic flow path and the second hydraulic flow path, and deliver hydraulic pressure of the one or more wheel cylinders to the first pressure chamber;
a seventh hydraulic flow path configured to connect the sixth hydraulic flow path to the third hydraulic flow path to deliver the hydraulic pressure of the one or more wheel cylinders to the second pressure chamber;
a first control valve provided at the first hydraulic flow path and configured to control an oil flow;
a second control valve provided at the second hydraulic flow path and configured to control an oil flow;

a third control valve provided at the third hydraulic flow path and configured to control an oil flow;
a seventh control valve provided at the sixth hydraulic flow path and configured to control an oil flow;
an eighth control valve provided at the seventh hydraulic flow path and configured to control an oil flow;
a first hydraulic circuit including first and second branching flow paths which branch from the first hydraulic flow path and are connected to two wheel cylinders, respectively, and first and second inlet valves which control the first and second branching flow paths, respectively; and
a second hydraulic circuit including third and fourth branching flow paths which branch from the second hydraulic flow path and are connected to two wheel cylinders, respectively.

2. The electric brake system of claim 1, wherein the seventh control valve is installed at an upstream side of a position at which the sixth hydraulic flow path and the seventh hydraulic flow path are connected to each other.

3. The electric brake system of claim 2, wherein the seventh control valve is configured with a solenoid valve configured to control bidirectionally an oil flow between the hydraulic pressure supply device and the one or more wheel cylinders.

4. The electric brake system of claim 3, further comprising:
a fifth control valve configured to branch from the sixth hydraulic flow path, provided at a flow path connected to the first hydraulic flow path, and configured to control an oil flow; and
a sixth control valve configured to branch from the sixth hydraulic flow path, provided at a flow path connected to the third hydraulic flow path, and configured to control an oil flow.

5. The electric brake system of claim 4, wherein one or more of the fifth and sixth control valves are configured with a check valve that allows an oil flow in a direction from the one or more wheel cylinders toward the hydraulic pressure supply device and blocks an oil flow in a reverse direction.

6. The electric brake system of claim 2, wherein the seventh control valve is configured with a normally closed type valve that is usually closed and is open when an opening signal is received.

7. The electric brake system of claim 1, further comprising:
an eighth hydraulic flow path configured to communicate the first pressure chamber with the second pressure chamber; and
a balance valve provided at the eighth hydraulic flow path, configured to control bidirectionally an oil flow between the first pressure chamber and the second pressure chamber, and configured with a solenoid valve.

8. The electric brake system of claim 7, wherein the eighth hydraulic flow path connects an upstream side of the first control valve of the first hydraulic flow path to the seventh hydraulic flow path.

9. The electric brake system of claim 8, wherein the eighth control valve is installed at the seventh hydraulic flow path, and the electric brake system further includes a balance valve that is configured with a normally closed type solenoid valve that is usually closed and is open when an opening signal is received.

10. The electric brake system of claim 7, wherein the balance valve is a normally closed type valve that is usually closed and is open when an opening signal is received.

11. The electric brake system of claim 1, further comprising:
a first dump flow path configured to communicate with the first pressure chamber and connected to a reservoir;
a second dump flow path configured to communicate with the second pressure chamber and connected to the reservoir;
a first dump valve provided at the first dump flow path, configured to control an oil flow, and configured with a check valve that allows an oil flow in a direction from the reservoir toward the first pressure chamber and blocks an oil flow in a reverse direction;
a second dump valve provided at the second dump flow path, configured to control an oil flow, and configured with a check valve that allows an oil flow in a direction from the reservoir toward the second pressure chamber and blocks an oil flow in a reverse direction; and
a third dump valve provided at a bypass flow path of the second dump flow path to connect an upstream side of the second dump valve to a downstream side thereof, configured to control an oil flow, and configured with a solenoid valve that bidirectionally controls an oil flow between the reservoir and the second pressure chamber.

12. The electric brake system of claim 11, wherein the third dump valve is a normally opened type valve that is usually open and is closed when a closing signal is received.

13. The electric brake system of claim 1, wherein one or more of the first and second control valves are configured with a check valve that allows an oil flow in a direction from the hydraulic pressure supply device toward the one or more wheel cylinders and blocks an oil flow in a reverse direction.

14. The electric brake system of claim 1, wherein the third hydraulic flow path includes:
a fourth hydraulic flow path configured to branch at the middle of the third hydraulic flow path and connected to the first hydraulic flow path; and
a fifth hydraulic flow path configured to branch at the middle of the third hydraulic flow path and connected to the second hydraulic flow path,
the third control valve is installed at the fourth hydraulic flow path,
the electric brake system further includes a fourth control valve installed at the fifth hydraulic flow path and configured to control an oil flow, and
the third control valve and the fourth control valve are configured with a check valve that allows an oil flow in a direction from the hydraulic pressure supply device toward the one or more wheel cylinders and blocks an oil flow in a reverse direction.

15. The electric brake system of claim 1, wherein the hydraulic pressure supply device further includes:
the cylinder block;
the piston movably accommodated inside the cylinder block and configured to perform a reciprocal movement by means of a rotational force of a motor;
a first communicating hole formed at the cylinder block forming the first pressure chamber and configured to communicate with the first hydraulic flow path;
a second communicating hole formed at the cylinder block forming the first pressure chamber and configured to communicate with the second hydraulic flow path; and
a third communicating hole formed at the cylinder block forming the second pressure chamber and configured to communicate with the third hydraulic flow path.

16. An electric brake system comprising:
a hydraulic pressure supply device including a motor configured to operate in response to an electrical signal that is output corresponding to a displacement of a brake pedal, a power conversion unit configured to convert a rotational force of the motor into a rectilinear movement, a cylinder block, a piston connected to the power conversion unit and movably accommodated inside the cylinder block, a first pressure chamber provided at one side of the piston and connected to one or more wheel cylinders, and a second pressure chamber provided at the other side of the piston and connected to the one or more wheel cylinders;
a first hydraulic flow path configured to communicate with the first pressure chamber and provide hydraulic pressure generated at the first pressure chamber to the one or more wheel cylinders;
a second hydraulic flow path configured to communicate with the first pressure chamber and provide the hydraulic pressure generated at the first pressure chamber to the one or more wheel cylinders;
a third hydraulic flow path configured to communicate with the second pressure chamber, configured to branch at the middle of the third hydraulic flow path to be connected to the first hydraulic flow path and the second hydraulic flow path, and configured to provide hydraulic pressure generated at the second pressure chamber to the one or more wheel cylinders;
a sixth hydraulic flow path configured to communicate with the first pressure chamber, configured to branch at the middle of the sixth hydraulic flow path to be connected to each of the first hydraulic flow path and the second hydraulic flow path, and configured to provide hydraulic pressure of the one or more wheel cylinders to the first pressure chamber;
a seventh hydraulic flow path configured to communicate with the second pressure chamber, configured to branch at the middle of the seventh hydraulic flow path to be connected to each of the first hydraulic flow path and the second hydraulic flow path, and configured to provide the hydraulic pressure of the one or more wheel cylinders to the second pressure chamber;
a first control valve provided at the first hydraulic flow path and configured to control an oil flow;
a second control valve provided at the second hydraulic flow path and configured to control an oil flow;
a third control valve provided at the third hydraulic flow path and configured to control an oil flow;
a seventh control valve provided at the sixth hydraulic flow path and configured to control an oil flow;
an eighth control valve provided at the seventh hydraulic flow path and configured to control an oil flow;
a first hydraulic circuit including first and second branching flow paths which branch from the first hydraulic flow path and are connected to two wheel cylinders, respectively, and first and second inlet valves which control the first and second branching flow paths, respectively;
a second hydraulic circuit including third and fourth branching flow paths which branch from the second hydraulic flow path and are connected to two wheel cylinders, respectively; and
an electronic control unit (ECU) configured to control an operation of the motor, and opening and closing of the seventh and eighth control valves, the first and second inlet valves, and third and fourth inlet valves.

17. The electric brake system of claim 16, wherein the ECU generates the hydraulic pressure in the first pressure chamber by moving the piston forward at an initial stage of braking, opens the first to fourth inlet valves to provide the hydraulic pressure generated in the first pressure chamber to the one or more wheel cylinders, moves the piston backward to generate the hydraulic pressure in the second pressure chamber when the piston is moved forward to arrive at a predetermined position, closes the seventh control valve to prevent the hydraulic pressure of the one or more wheel cylinders from being discharged due to negative pressure generated in the first pressure chamber, and allows the hydraulic pressure generated in the second pressure chamber to be additionally provided to the one or more wheel cylinders through the first to fourth inlet valves which are open.

18. The electric brake system of claim 17, wherein the hydraulic pressure provided to the one or more wheel cylinders while the piston is moved backward is greater than the hydraulic pressure provided to the one or more wheel cylinders while the piston is maximally moved forward.

19. The electric brake system of claim 16, wherein, when braking is released, the ECU moves the piston backward to generate the negative pressure in the first pressure chamber and opens the first to fourth inlet valves and the seventh control valve to allow oil of the one or more wheel cylinders to flow into the first pressure chamber, or moves the piston forward to generate negative pressure in the second pressure chamber and opens the first to fourth inlet valves and the eighth control valve to allow the oil of the one or more wheel cylinders to flow into the second pressure chamber.

20. The electric brake system of claim 16, further comprising:
an eighth hydraulic flow path configured to communicate with the first pressure chamber and the second pressure chamber; and
a balance valve provided at the eighth hydraulic flow path and configured to control an oil flow,
wherein, when an imbalance in pressure between the first pressure chamber and the second pressure chamber occurs, the ECU opens the balance valve to accomplish a balance in pressure between the first pressure chamber and the second pressure chamber.

* * * * *